United States Patent
Hayakawa et al.

(10) Patent No.: US 7,939,174 B2
(45) Date of Patent: *May 10, 2011

(54) HEAT-SHRINKABLE POLYESTER FILM ROLL AND A PROCESS FOR PRODUCING THE SAME

(75) Inventors: Satoshi Hayakawa, Inuyama (JP); Norimi Tabota, Inuyama (JP); Yoshinori Takegawa, Ohtsu (JP); Katsuya Ito, Ohtsu (JP); Shigeru Komeda, Osaka (JP); Katsuhiko Nose, Osaka (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 1497 days.

This patent is subject to a terminal disclaimer.

(21) Appl. No.: 11/159,144

(22) Filed: Jun. 23, 2005

(65) Prior Publication Data

US 2005/0236731 A1 Oct. 27, 2005

Related U.S. Application Data

(62) Division of application No. 10/221,645, filed as application No. PCT/JP02/04233 on Apr. 26, 2002, now Pat. No. 6,939,616.

(51) Int. Cl.
*B32B 27/36* (2006.01)
*C08G 63/16* (2006.01)
*C08G 63/18* (2006.01)
*C08G 63/181* (2006.01)
*C08G 63/183* (2006.01)

(52) U.S. Cl. ...... 428/480; 428/34.9; 428/35.1; 428/910; 528/302; 528/305; 528/307; 528/308; 528/308.6

(58) Field of Classification Search .......... None
See application file for complete search history.

(56) References Cited

U.S. PATENT DOCUMENTS

| | | | |
|---|---|---|---|
| 3,662,306 A | | 5/1972 | Heinis |
| 4,020,141 A | * | 4/1977 | Quinn et al. ............... 264/466 |
| 4,451,422 A | | 5/1984 | Yui et al. |
| 4,814,426 A | | 3/1989 | Utsumi et al. |
| 4,983,653 A | | 1/1991 | Fukuda et al. |
| 4,996,291 A | * | 2/1991 | Yoshinaka et al. ........... 528/272 |
| 5,070,180 A | | 12/1991 | Fukuda et al. |
| 5,079,051 A | | 1/1992 | Garland et al. |
| 5,534,570 A | | 7/1996 | Shih et al. |
| 5,656,356 A | * | 8/1997 | Masuda et al. ............... 428/141 |
| 5,859,116 A | | 1/1999 | Shih |
| 5,932,685 A | | 8/1999 | Mori et al. |
| 5,985,387 A | | 11/1999 | Mori et al. |
| 6,046,265 A | | 4/2000 | Clark et al. |
| 6,159,408 A | | 12/2000 | Kitayama et al. |
| 6,202,947 B1 | | 3/2001 | Matsumoto et al. |
| 6,342,281 B2 | * | 1/2002 | Hayakawa et al. ........... 428/35.2 |
| 6,383,627 B2 | * | 5/2002 | Hashimoto et al. ........... 428/332 |
| 6,447,925 B1 | * | 9/2002 | Tabota et al. ................. 428/480 |
| 6,451,445 B1 | | 9/2002 | Ito et al. |
| 6,458,437 B1 | | 10/2002 | Ito et al. |
| 6,465,063 B1 | | 10/2002 | Hayakawa et al. |
| 6,517,948 B1 | | 2/2003 | Grant et al. |
| 6,524,669 B2 | | 2/2003 | Ito et al. |
| 6,548,595 B2 | * | 4/2003 | Ito et al. ..................... 524/599 |
| 6,663,928 B2 | * | 12/2003 | Ito et al. ..................... 428/35.1 |
| 6,699,549 B1 | * | 3/2004 | Ueyama et al. ............. 428/36.7 |
| 6,720,085 B2 | | 4/2004 | Ito et al. |
| 6,761,966 B2 | * | 7/2004 | Ito et al. ..................... 428/221 |
| 6,939,616 B2 | * | 9/2005 | Hayakawa et al. ........... 428/480 |
| 6,958,178 B2 | * | 10/2005 | Hayakawa et al. .......... 428/34.9 |
| 7,001,651 B2 | * | 2/2006 | Hayakawa et al. .......... 428/34.9 |
| 7,279,204 B2 | * | 10/2007 | Ito et al. ..................... 428/34.9 |
| 7,303,812 B2 | * | 12/2007 | Hashimoto et al. ........ 428/318.6 |
| 7,344,765 B2 | * | 3/2008 | Hayakawa et al. .......... 428/34.9 |
| 2001/0014729 A1 | | 8/2001 | Hayakawa et al. |
| 2001/0038920 A1 | | 11/2001 | Hashimoto et al. |
| 2003/0165671 A1 | | 9/2003 | Hashimoto et al. |
| 2003/0170427 A1 | | 9/2003 | Ito et al. |
| 2004/0180229 A1 | * | 9/2004 | Hayakawa et al. ............ 428/480 |
| 2004/0191493 A1 | | 9/2004 | Hayakawa et al. |

(Continued)

FOREIGN PATENT DOCUMENTS

EP 271928 A2 6/1988

(Continued)

OTHER PUBLICATIONS

Notification of Reasons for Refusal, Jun. 15, 2004, issued from Japanese Patent Office in counterpart JP 2002-123728.
Supplementary European Search Report No. 2722834 dated Aug. 10, 2004, Applicants: Toyo Boseki Kabushiki Kaisha.
James K. Prescott, Maintaining Product Uniformity and Uninterrupted Flow to Direct-Compression Tableting Presses, Pharmaceutical Technology, vol. 18, No. 6, Jun. 1994, pp. 98-114.
Notification of Reasons for Refusal, JP Application No. 2002-123728, Jun. 7, 2004.
Japan Patent Office; Notice of Reasons for Refusal dated Jun. 3, 2008 in Japanese Application No. JP2005-356823.
Japan Patent Office; Notice of Reasons for Refusal dated Dec. 9, 2008 in Japanese Application No. JP2005-356824.

(Continued)

*Primary Examiner* — Vivian Chen
(74) *Attorney, Agent, or Firm* — Kenyon & Kenyon LLP

(57) ABSTRACT

A film roll of a heat-shrinkable polyester film characterized in that the heat-shrinkable polyester film meets the following requirements (1) and (2).
(1) When samples are cut off therefrom at an almost equal interval along the longitudinal direction, and immersed in hot water at 85° C. for 10 seconds, subsequently in water at 25° C. and withdrawn, heat-shrinkage percentages in the maximum shrinkage direction of all the samples are 20% or more.
(2) When raw polymers used for production of the film above comprises of a major constitutional unit and one or more sub constitutional units different therefrom; and the content of the primary sub constitutional unit is determined, the content of the primary sub constitutional unit in each sample is more than 7 mole % in 100% of all constitutional units, and when an average of the contents of the primary sub constitutional unit is calculated, the contents thereof of all the samples fall within a range of ±2 mole % relative to the average.

26 Claims, No Drawings

U.S. PATENT DOCUMENTS

| | | | |
|---|---|---|---|
| 2004/0241470 | A1 | 12/2004 | Hayakawa et al. |
| 2005/0095379 | A1* | 5/2005 | Hayakawa et al. .......... 428/35.1 |
| 2008/0284057 | A1* | 11/2008 | Hayakawa et al. ...... 264/211.12 |

FOREIGN PATENT DOCUMENTS

| | | | |
|---|---|---|---|
| EP | 826482 | A2 | 3/1998 |
| EP | 854175 | A2 | 7/1998 |
| EP | 934813 | A2 | 8/1999 |
| EP | 1 024 162 | | 8/2000 |
| EP | 1 024 162 | A2 * | 8/2000 |
| EP | 1 055 506 | A1 | 11/2000 |
| EP | 1 090 739 | A2 * | 4/2001 |
| JP | 51-039775 | | 4/1976 |
| JP | 57159618 | A | 10/1982 |
| JP | 59097175 | A | 6/1984 |
| JP | 61-064430 | | 4/1986 |
| JP | 61203161 | A | 9/1986 |
| JP | 62091555 | A | 4/1987 |
| JP | 63156833 | A | 6/1988 |
| JP | 63236623 | A | 10/1988 |
| JP | 1258935 | A | 10/1989 |
| JP | 2155630 | A | 6/1990 |
| JP | 2202428 | A | 8/1990 |
| JP | 3029763 | A | 2/1991 |
| JP | 3081338 | A | 4/1991 |
| JP | 3086522 | A | 4/1991 |
| JP | 3099828 | A | 4/1991 |
| JP | 3142224 | A | 6/1991 |
| JP | 3143619 | A | 6/1991 |
| JP | 4004229 | A | 1/1992 |
| JP | 4-117432 | | 4/1992 |
| JP | 4193526 | A | 7/1992 |
| JP | 4356533 | A | 12/1992 |
| JP | 5138737 | A | 6/1993 |
| JP | 5254015 | A | 10/1993 |
| JP | 5318586 | A | 12/1993 |
| JP | 5318587 | A | 12/1993 |
| JP | 5318588 | A | 12/1993 |
| JP | 647810 | | 2/1994 |
| JP | 6031806 | A | 2/1994 |
| JP | 3001349 | U | 6/1994 |
| JP | 6320621 | A | 11/1994 |
| JP | 7024911 | A | 1/1995 |
| JP | 7032478 | A | 2/1995 |
| JP | 7053756 | A | 2/1995 |
| JP | 7149922 | A | 6/1995 |
| JP | 07-205283 | | 8/1995 |
| JP | 07-227903 | | 8/1995 |
| JP | 7205284 | A | 8/1995 |
| JP | 7216107 | A | 8/1995 |
| JP | 7216109 | A | 8/1995 |
| JP | 8127024 | A | 5/1996 |
| JP | 9071668 | A | 3/1997 |
| JP | 09-239833 | * | 9/1997 |
| JP | 09-239834 | * | 9/1997 |
| JP | 9239833 | A | 9/1997 |
| JP | 10087851 | A | 4/1998 |
| JP | 10139988 | A | 5/1998 |
| JP | 10180807 | A | 7/1998 |
| JP | 10298313 | A | 11/1998 |
| JP | 11035701 | A | 2/1999 |
| JP | 11315152 | A | 11/1999 |
| JP | 2000-135737 | | 5/2000 |
| JP | 2000-135738 | | 5/2000 |
| JP | 2000-167928 | | 6/2000 |
| JP | 2000-169601 | | 6/2000 |
| JP | 2000-169602 | | 6/2000 |
| JP | 2000263547 | A | 9/2000 |
| JP | 2001-096616 | * | 4/2001 |
| JP | 200196616 | A | 4/2001 |
| JP | 2001200072 | A | 7/2001 |
| JP | 2001200076 | A | 7/2001 |
| JP | 2003 170494 | A | 6/2003 |
| KR | 2000-0022395 | | 4/2000 |
| KR | 100491648 | | 11/2005 |
| WO | WO 98/03589 | | 1/1998 |
| WO | 0112697 | A1 | 2/2001 |

OTHER PUBLICATIONS

Opposition Brief filed by Klöckner Pentaplast GmbH & Co. KG on Nov. 6, 2008 in European No. Patent 1 391 288 B, including Citation E1 (Feature analysis of claim 1), Citation E3 (Warning letter by patentee), Citation E4 (Measured values for SF-E 649), Citation E5 (E-mail by KP of America), and Citation E8 (Shrinkage Values of PET film in air/water ) and the English translations of the Opposition Brief, Citation E1 and Citation E8.

Wikipedia, an entry on "Average" at http://en.wikipedia.org/wiki/Average (Oct. 28, 2008).

Japan Patent Office, International Search Report in International Application No. PCT/JP02/04233, dated Sep. 3, 2002.

Japan Patent Office, Notice of Reasons for Rejection in related Japanese Patent Application No. 2002-123728, dated Oct. 11, 2005.

European Patent Office, Supplementary Partial European Search Report in related European Application No. 02722834.5, dated Apr. 20, 2004.

European Patent Office, Supplementary European Search Report in related European Application No. 02722834.5, dated Oct. 8, 2004.

European Patent Office, Official Communication in related European Application No. 02722834.5, dated May 22, 2006.

European Patent Office, Official Communication in related European Application No. 02722834.5, dated May 10, 2007.

European Patent Office, Communication re Letter from the Opponent in related European Application No. 02722834.5, dated Apr. 22, 2010.

Modline 3, Infrared Temperature Measurement System, Modline 3 Catalog (2009), IRCON, Inc. (filed by Opponent in related European Application No. 02722834.5).

European Patent Office, Extended Search Report in related European Application No. 08151319.4, dated Apr. 14, 2008.

European Patent Office, Official Communication in related European Application No. 08151319.4, dated Feb. 18, 2009.

Japan Patent Office, Decision of Refusal in related Japanese Patent Application No. 2005-356823, dated Aug. 26, 2008.

Australian Patent Office, Office Action in related Australian application No. 2002253621, dated Jun. 11, 2003.

Canadian Patent Office, Office Action in related Canadian application No. 2406523, dated Jan. 14, 2003.

Canadian Patent Office, Office Action in related Canadian application No. 2406523, dated Apr. 29, 2004.

State Intellectual Property Office of People's Republic of China, Office Action in related Chinese application No. 02801408.1, dated Nov. 26, 2004.

State Intellectual Property Office of People's Republic of China, Office Action in related Chinese application No. 02801408.1, dated Sep. 23, 2005.

State Intellectual Property Office of People's Republic of China, Office Action in related Chinese application No. 200510052987.2, dated Feb. 10, 2006.

State Intellectual Property Office of People's Republic of China, Office Action in related Chinese application No. 200510053152.9, dated Feb. 10, 2006.

Korean Intellectual Property Office, Notice of Preliminary Rejection in related Korean application No. 10-2002-7013858, dated Dec. 20, 2004.

Korean Intellectual Property Office, Notice of Preliminary Rejection in related Korean application No. 10-2002-7013858, dated Mar. 23, 2005.

Korean Intellectual Property Office, Notice of Preliminary Rejection in related Korean application No. 10-2004-7016061, dated Mar. 23, 2005.

Korean Intellectual Property Office, Notice of Preliminary Rejection in related Korean application No. 10-2004-7016061, dated Nov. 23, 2005.

Korean Intellectual Property Office, Notice of Preliminary Rejection in related Korean application No. 10-2005-7013548, dated Sep. 27, 2005.

Certified Experiment Results filed in related Korean application No. 10-2005-7013548, dated Dec. 19, 2005.

Korean Intellectual Property Office, Notice of Decision of Rejection in related Korean application No. 10-2005-7013548, dated Feb. 14, 2006.

Hinrichsen, et al., Thermal-mechanical analysis of drawn poly(ethyleneterephthalate) and poly(amide) films, Thermochimica Acta, 61(1983), pp. 161-168, Elsevier Scientific Publishing Company, Amsterdam.

Explanation of circumstances concerning accelerated examination (filed Feb. 25, 2004 in related JP application No. 2002-123728).

Written statement and the Certified Experiment Results (filed May 13, 2005 in related JP application No. 2002-123728).

Explanation of circumstances concerning accelerated examination (filed Dec. 17, 2001 in related JP application No. 2001-293730.

Explanation of circumstances concerning accelerated examination (filed Dec. 17, 2001 in related JP application No. 2001-299764.

The Certified Experiment Results (filed Aug. 8, 2006 in related CN application No. 200510052987.2).

The Certified Experiment Results (filed Aug. 8, 2006 in related CN application No. 200510053152.9).

Information Submission (filed Oct. 24, 2005 by the opponent in related KR application No. 10-2004-7016061).

Fancy Wrap, 1998, Gunze Ltd. (filed by the opponent in related KR application No. 10-2004-7016061).

The Certified Experiment Results (filed Apr. 20, 2005 in related CN application No. 02801408.1).

Deiringer, Declaration re EP 1 391 288 B1 Heat-Shrinkable Polyester Film Roll and Process for Producing the Same, dated Jan. 17, 2011.

Shih, Shrinkage Modeling of Polyester Shrink Film, Polymer Engineering and Science, Jul. 1994, 34(14): 1121-1128.

Schweitzer, document related to Oral Proceedings taking place Wednesday, Jan. 19, 2011 for related European Patent No. 1 391 288, dated Jan. 17, 2011.

\* cited by examiner

HEAT-SHRINKABLE POLYESTER FILM ROLL AND A PROCESS FOR PRODUCING THE SAME

This is a division of application Ser. No. 10/221,645 filed 16 Sep. 2002, which is a 371 national phase of PCT/JP02/04233 filed 26 Apr. 2002, which claims priority to the following Japanese Patent Applications:

JP 2001-130147 filed 26 Apr. 2001
JP 2001-145114 filed 15 May 2001
JP 2001-170045 filed 5 Jun. 2001
JP 2001-218683 filed 18 Jul. 2001
JP 2001-226594 filed 26 Jul. 2001
JP 2001-232507 filed 31 Jul. 2001
JP 2001-233972 filed 1 Aug. 2001
JP 2001-294089 filed 26 Sep. 2001
JP 2001-293732 filed 26 Sep. 2001
JP 2001-293730 filed 26 Sep. 2001
JP 2001-296800 filed 27 Sep. 2001
JP 2001-299905 filed 28 Sep. 2001
JP 2001-299765 filed 28 Sep. 2001
JP 2001-299906 filed 28 Sep. 2001
JP 2001-299764 filed 28 Sep. 2001 the contents of which are incorporated herein by reference.

TECHNICAL FIELD

The present invention relates to a film roll of a heat-shrinkable polyester film. In particular, the present invention relates to a roll of a heat-shrinkable polyester film that is uniform in composition substantially over the entire length, or a roll thereof that is uniform additionally in heat shrinkage properties substantially over the entire length of the film. The heat-shrinkable polyester film in this roll is characteristic in that there is a fewer incidence of defective products in production processes of products such as labels, bags, or others, and a distinctly fewer incidence of defects such as insufficient shrinkage, shrinkage shading, whitening, crinkling, deformation, uneven shrinkage in the direction orthogonal to the maximum shrinkage direction, etc., in the heat shrinkage process.

BACKGROUND ART

Heretofore, heat-shrinkable polyester films (hereinafter, occasionally referred to only as the film) have been widely used as shrink (accumulative) packaging products, shrink labels, cap seals, etc., for a variety of containers such as polyethyleneterephthalate (PET) containers, polyethylene containers, glass containers, utilizing the heat shrinkable property thereof.

For production of labels or the like, the following procedures are usually employed. Namely, a raw polymer in a molten state is continuously extruded into an undrawn film. Subsequently, the undrawn film is drawn and wound to give a heat-shrinkable polyester film roll. The film in the roll is then unwound and slit into a film with a desired width, which is rewound into another roll. Subsequently, various characters and figures such as product name and the like are printed on the resulting film. After printing, the film is folded and bonded along both edges by means of, for example, solvent adhesion, to give a tubular film (in tubing process). Meanwhile, there are cases where the sequence of the printing and the slitting processes is opposite. The tubular film thus obtained may be cut into tubular labels with a desired length, which is further converted into bags by bonding along an edge of openings thereof.

Subsequently, containers clothed in the labels or the bags above are passed, for example on a belt conveyer, through a shrinking tunnel such as the steam tunnel wherein heated steam is blown in for heat shrinkage and the hot-air tunnel wherein hot air is blown in, to give the final products (labeled containers) having the labels or the bags tightly attached thereto.

When variation in the heat shrinkage percentage of the labels, the bags, or others is large, there are occasionally produced defective labels and bags which do not exhibit proper heat shrinkage percentage in the heat shrinkage process, since the tunnel is controlled in a same heating condition during the production. As a result, large variation in the heat shrinkage properties leads to products inferior in appearance caused by insufficient shrinkage, shrinkage shading, crinkling, deformation in printed drawings, uneven shrinkage in the direction orthogonal to the maximum shrinkage direction, etc., which can not be shipped to market.

Usually, labels or bags for a specific product are produced from a single film roll, and thus large variation in heat shrinkage properties of a film in a film roll leads to a higher defective fraction in the heat shrinkage process. Further, when the solvent adhesion is employed in the tubing process above, a large variation in the solvent adhesiveness in the film feeding direction (longitudinal direction) of the film in a film roll often leads to defects in appearance of a tubular film produced from the film roll such as loss of planarity and corrugation of the solvent adhesion portion of the film due to swelling thereof by penetration of the solvent. When the variation in adhesiveness of the solvent adhesion of the tubular film is large, the portions bonded by the solvent adhesion in labels, bags or the like produced therefrom are occasionally separated during wrapping and shrinking thereof around containers in the wrapping and shrinking process, or during the storage of the final products after shrinkage. Further, since the tubular film become exposed under large pressure in the tube roll of the tubular film above, the portions of the tubular film where there are the defects of appearance such as corrugation described above often cause problems of a high incidence of blocking during storage in the roll.

The large variation in adhesiveness of the solvent adhesion also leads to problems in that when the tubular film is cut into labels, the cutting portions (opening) are fused by heat and consequently the resulting labels cannot be wrapped around containers, and in that the tubular film becomes difficult to be cut, causing defects in the cutting process.

The object of the present invention is to provide a heat-shrinkable polyester film roll and a process for producing the same, which can solve the various problems in the production processes described above, and thus decrease the incidence of defects in the products, during the processes of producing heat-shrinkable labels, bags or the like from a roll of a long film and of wrapping and shrinking the same around containers to produce labeled container products.

DISCLOSURE OF THE INVENTION

The present invention relates to a film roll of a heat-shrinkable polyester film, and the heat-shrinkable polyester film is characterized by meeting the following requirement (1) and the following requirement (2) (or at least one of the requirements (3) to (8) that will be described later).

(1) When an initiation end of winding of a film which is obtained from a steady region wherein physical properties of the film are stabilized in a longitudinal direction is designated as a first end, and a termination end of winding thereof is designated as a second end, a first cut-off point of samples is provided at a position 2 m or less inner from the second end, a final cut-off point of the samples is provided at a position 2 m or less inner from the first end, and additionally a plurality of sample cut-off points are provided at an interval of about 100 m from the first cut-off point; the samples are square samples in a size of 10 cm×10 cm cut off from each of the cut-off points; and heat shrinkage percentage of each sample in the maximum shrinkage direction is 20% or more after the respective samples are immersed in hot water at 85° C. for 10 seconds, subsequently in water at 25° C. for 10 seconds, and withdrawn.

(2) When a raw polymer used for production of the film comprises a major constitutional unit and one or more sub constitutional units different therefrom, and the sub constitutional unit which is present in the greatest amount among all the sub constitutional units is designated as a primary sub constitutional unit, the content of the primary sub constitutional unit in the each sample properly cut off from each of the cut-off points described in the requirement (1) is more than 7 mole % in 100 mole % of all the constitutional units, and when an average of the content of the primary sub constitutional unit is calculated, the contents thereof of all the samples fall within a range of ±2 mole % relative to the average content.

The film roll of the heat-shrinkable polyester film of the present invention that meets the requirement (1) above and at least one of the requirements (2) to (5) is low in the variation in film composition over entire length of steady region of the film, and thus can decrease the incidence of defects in the production processes of labels, bags, or the like from the film roll, and also provide significantly uniform heat shrinkage behavior throughout the film. A film roll of a heat-shrinkable polyester film that meets the requirement (1) above and at least one of the requirements (6) to (8) is distinctly low in the variation in heat shrinkage properties of the film, consequently, in heat shrinkage properties of each of the resulting labels, bags or the like, thus enabling to drastically reduce defects in the products.

BEST MODE FOR CARRYING OUT THE INVENTION

The present inventors have examined the production processes for labels, bags or the like from the heat-shrinkable polyester film described above and the various defects generated in the heat shrinkage process, and found that these defects do not arise from film prepared from homo polymer, but from film prepared from polymer having not only a major constitutional unit but sub constitutional units, obtained by copolymerization or blending of polymers. Namely, it was considered that such polymer generated a large variation in the polymer composition in a long film, leading to a variation in the heat shrinkage properties of the resulting products. The present inventors have found that the film roll of the heat-shrinkable polyester of the present invention was low in the variation in composition and heat shrinkage pattern, and did not generate those defects described above. Hereinafter, the present invention will be described in detail.

The present invention relates to a heat-shrinkable polyester film roll. The heat-shrinkable polyester film roll of the present invention provides heat shrinkable products having an excellent heat shrinkage properties in a wide range of temperature form low to high, having an excellent appearance with fewer shrinkage shading, crinkling, and deformation, and having an excellent luster and transparency.

The heat-shrinkable polyester film in the heat-shrinkable polyester film roll of the present invention must satisfy the following requirement (1).

(1) When an initiation end of winding of a film which is obtained from a steady region wherein physical properties of the film are stabilized in a longitudinal direction is designated as a first end, and a termination end of winding thereof is designated as a second end, a first cut-off point of samples of the film is provided at a position 2 m or less inner from the second end, a final cut-off point of the samples is provided at a position 2 m or less inner from the first end, and a plurality of additional sample cut-off points are provided at an interval of about 100 m from the first cut-off point; the samples are square samples in a size of 10 cm×10 cm cut off from each of the cut-off points; all the samples have a heat shrinkage percentage of 20% or more in a maximum shrinkage direction after the respective samples are immersed in hot water at 85° C. for 10 seconds, subsequently in water at 25° C. for 10 seconds, and withdrawn.

The phrase, "a steady region wherein physical properties of the film are stabilized", in the requirement (1) above will be described first. "A steady region wherein physical properties of the film are stabilized" is a region wherein the film is produced in a stable manner in the extruding and drawing processes, and thus has physical properties substantially uniformly controlled. The present invention is based on a technical concept to uniformize an amount of the primary sub constitutional unit and other properties at a higher level than the conventional level in a long film produced in a steady state both in the extruding and drawing processes. In the real operation, composition of the film may vary depending on the supply method of the raw materials and the extruding condition employed for production thereof, and the concept of the present invention to uniformize is not intended to be applied to the films which are produced in an unstable condition of the material supply and/or the extruding processes. Therefore, it is assumed as a prerequisite that sampling of film for evaluation of particular properties to be uniformized is conducted only in a region thereof which are produced in a stable state both in the extruding and drawing processes, i.e., "a steady region".

Thus, for example, when a film portion, of about 10 m length from the initiation end of winding, is not produced in the steady state, sampling is not done in this portion, but in other portion assuming that a position 10 m from the initiation of winding is the first end of the film.

The number of the steady regions above (steady operation regions) is usually 1 per film roll (over entire length of the film roll). But, there are cases where such steady regions are present in multiple sites, and in such a case, sampling is conducted only in these steady regions. The steady region above can be evaluated, for example, by measuring heat shrinkage percentage in the maximum shrinkage direction of the film according to the method that will be described later. Namely, a region wherein a difference in the heat shrinkage percentage is in a range of less than about 20% (a difference between the maximum value and the minimum value in a plurality of samples is less than about 20%) may be regarded as the steady region.

Method of sampling will be described next. When the initiation end of winding of a film in a steady region in a film roll is designated as the first end, and the termination end of winding thereof as the second end, the first cut-off point of the samples is provided at a position 2 m or less inner from the second end above, the final cut-off point is provided at a position 2 m or less inner from the first end above, and additionally a plurality of sample cut-off points at an interval of about 100 m from the first cut-off point, and thus samples from sampling points provided at an approximately equal interval over the entire length of the film in the steady region are collected. Here, the phrase "an interval of about 100 m" means that the samples may be cut off at an interval of 100 m±about 1 m.

The method of sampling above will be described more in detail. For example, in a case of a roll having a heat-shrinkable film of 498 m in length, and in the steady region over the entire length, first sample (i) is cut off from a portion of the film at 2 m or less from the termination end of winding (the second end). Area of the sample is to be properly determined based on the properties to be measured. Subsequently, the second sample (ii) is cut off at a position about 100 m from the position where the first sample (i) is cut off. Similarly, the third sample (iii) is cut off at a position about 200 m, the fourth sample (iv) at about 300 m, and the fifth sample (v) at about 400 m from the position of the first sampling. Here, since the remaining film is shorter than 100 m, the sixth (final) sample (vi) is cut off from a portion of the film at 2 m or less from the initiation end of winding (the first end).

The requirement (1) above of the present invention is that the heat shrinkage percentage in the maximum shrinkage direction of each sample thus cut off should be 20% or more. A heat-shrinkable polyester film having the heat shrinkage percentage below 20% is not favorable since heat shrinkage percentage thereof is not sufficient to be tightly attached to a container when the container clothed in the film is heat-shrunk, and to avoid generation of defects in appearance. The heat shrinkage percentage is more preferably 40% or more, and furthermore preferably 60% or more.

Here, the heat shrinkage percentage in the maximum shrinkage direction means a heat shrinkage percentage in a direction where shrinkage of a sample is largest, and the maximum shrinkage direction is a direction having shortest side after shrinkage of the square sample cut off. The heat shrinkage percentage (%) is a value determined by immersing a 10 cm×10 cm sample in hot water at 85° C.±0.5° C. for 10 seconds under no load to induce heat shrinkage, immersing immediately in water at 25° C.±0.5° C. for 10 seconds, measuring length of the sample in the maximum shrinkage direction, and by calculating according to the following equation (hereinafter, the heat shrinkage percentage in the maximum shrinkage direction measured in this condition will be referred to simply as the heat shrinkage percentage).

$$\text{Heat shrinkage percentage (\%)} = 100 \times \frac{\left(\begin{array}{c}\text{Length before shrinkage} - \\ \text{Length after shrinkage}\end{array}\right)}{(\text{Length before shrinkage})}$$

The requirement (2) of the present invention is that when a raw polymer used for production of the film comprises a major constitutional unit and one or more sub constitutional units different therefrom, and the sub constitutional unit which is present in the greatest amount among all the sub constitutional units is designated as a primary sub constitutional unit, the content of the primary sub constitutional unit in the each sample properly cut off from each of the cut-off points described in the requirement (1) is 7 mole % or more in 100 mole % of all the constitutional units, and when an average of the content of the primary sub constitutional unit is calculated, the contents thereof of all the samples fall within a range of ±2 mole % relative to the average content.

Here, the "constitutional unit" refers to a repeating unit formed in a condensation reaction of 1 mole of a polybasic carboxylic acid component and 1 mole of a polyhydric alcohol component used as starting materials; the "major constitutional unit" to an unit present in an amount of 50 mole % or more in 100 mole % of all constitutional units; the "sub constitutional units" to all units different from the "major constitutional unit"; and the "primary sub constitutional unit" to a unit present in the greatest amount among the "sub constitutional units", respectively.

In the requirement (2), the raw polymer to be used for production of polyester film should contain one or more sub constitutional units, as well as the major constitutional unit. The sub constitutional units are essential for providing film properties different from those determined by the major constitutional unit, especially heat shrinkage and solvent adhesion properties. The film containing both the major constitutional unit and the sub constitutional units exhibits excellent heat shrinkage properties over a wide temperature range. The film also has an excellent solvent adhesion property.

The primary sub constitutional unit is a unit most favorable among the sub constitutional units for improvement of properties of the resulting film, and thus is required to be contained in an amount of 7 mole % or more in 100 mole % of all constitutional units. Therefore, the content (mole %) of the primary sub constitutional unit above in each sample cut off by the sampling method described above must be 7 mole % or more. When the content is below 7 mole %, it is unfavorable since there are cases where the effect of the primary sub constitutional unit cannot be exerted sufficiently. The lower limit of the content is more preferably 8 mole %, and furthermore preferably 10 mole %.

The raw polymer of the film may contain other sub constitutional units as well as the primary sub constitutional unit. In such a case, the lower limit thereof is, but not limited to, preferably 5 mole % or more in 100 mole % of all constitutional units for expressing the beneficial effect on properties. An excessive amount of the sub constitutional units in the raw material results in decrease in the major constitutional unit for such properties of the film as anti-breaking property, tensile strength and heat resistance, which leads deterioration of these properties. Therefore, the upper limit of the total sub constitutional units including the primary sub constitutional unit is preferably 50 mole %, more preferably 40 mole %, and furthermore preferably 30 mole %.

The major constitutional unit is preferably an ethylene-terephthalate unit consisting of ethylene glycol and terephthalic acid, since it is excellent in anti-breaking property, tensile strength and heat resistance, etc., of the resulting film. The primary sub constitutional unit is preferably a unit consisting of 1,4-cyclohexane dimethanol and terephthalic acid, or a unit consisting of neopentyl glycohol and terephthalic acid, or a unit consisting of 1,4-butanediol and terephthalic acid, since each of them has the required heat shrinkage potential and exerts the heat shrinkage at a lower temperature. The other sub constitutional units are preferably selected from the units exemplified above as a primary sub constitutional unit excluding the unit employed as the primary sub constitutional unit. More specific examples of the constitutional units of the polyester will be described later in more detail.

In requirement (2), the variation in the content (mole %) of the primary sub constitutional units above, in addition, should be small. The object of the present invention is to provide a roll of a film having uniform film properties over the entire length of the steady region. Variation in the content of the primary sub constitutional unit used for improvement in the properties in the long film leads to variation in the solvent adhesion and heat shrinkage properties thereof, and thus results in frequent incidence of defects in the tubing process, and the wrapping and shrinking process. Therefore, when the contents of the primary sub constitutional unit in a plurality of samples cut off in the sampling method described above were determined and an average thereof was calculated, the contents (mole %) of the primary sub constitutional unit of all the samples should fall within a range of ±2 mole % relative to the average content in the requirement (2).

The content of the primary sub constitutional unit can be determined, for example, by NMR or the like. For measurement of the content of the primary sub constitutional unit by NMR, the sample is required only in an amount of about 30 mg/per measurement. Typical procedures for the NMR measurement are as follows.

(i) A film sample (about 30 mg) is dissolved in a mixture of chloroform D (produced by Euriso-top) and trifluoroacetate D1 (produced by Euriso-top) at a ratio of 10:1 (volume ratio), to give a sample solution.

(ii) The sample solution is analyzed by proton NMR ("GEMINI-200"; produced by Varian) in a condition of a temperature of 23° C. and an integration number of 64.

(iii) Composition of the sample is determined from the proton peak intensity.

When the contents of the primary sub constitutional unit of all the samples are determined, the average is designated as A (mole %), and the content of the sample (i) is designated as B1 (mole %), the phrase in requirement (2), "within a range of ±2 mole % relative to the average content", means that a value of |A-B1| [an absolute value of (A-B1)] should be below 2 (mole %), and in respect to the contents B2 to B6 (mole %) for samples (ii) to (vi), values of |A-Bn| should also be lower than 2 (mole %). In other words, the requirement (2) is fulfilled when the difference between the maximum value Bmax in Bn and the value A, and the difference between the minimum value Bmin in Bn and the value A are both within a range of ±2 mole %.

Decrease in the variation in the content of the primary sub constitutional unit in a heat-shrinkable film of a roll leads to an increased stability in adhesiveness by solvent adhesion and a fewer incidence of troubles in the tubing process. It also leads to a fewer incidence of troubles in the cutting process. Additionally, since it also leads to decrease in the variation in heat shrinkage properties of labels, bags and the like, thus to decrease the incidence of troubles in the wrapping and shrinking processes, and thus to a marked reduction in defective fractions of the final products. The variation in the content of the primary sub constitutional unit is preferably within a range of ±1.5 mole % relative to the average content, more preferably of ±1 mole %.

It is preferable to have a smaller variation in the content of other sub constitutional units as well, for production of long films having uniformity in the physical properties over the entire length of the steady region. Third requirement (3) of the present invention defines a requirement of the secondary sub constitutional unit, present in the film in an amount second largest to the primary sub constitutional unit. Namely, the requirement (3) is when a raw polymer used for production of the film comprises a major constitutional polymer and two or more sub constitutional units different therefrom, and the sub constitutional unit which is present in the second largest amount among all the sub constitutional units is designated as a secondary sub constitutional unit, the content of the secondary sub constitutional unit in the each sample properly cut off from each of the cut-off points defined in the requirement (1) is 5 mole % or more in 100 mole % of all the constitutional units, and when an average of the content of the secondary sub constitutional unit is calculated, the contents thereof of all the samples fall within a range of ±2 mole % relative to the average content.

The secondary sub constitutional unit is required to be present in the film in an amount of 5 mole % or more for exerting the effect. The upper limit of the content is not limited, but the content of all sub constitutional units including the primary sub constitutional unit is preferably adjusted to be below 50 mole %. As described above, it is because a decrease in the content of the major constitutional unit leads to decreases in physical properties such as tensile strength.

The measurement of the content of the secondary sub constitutional unit can be carried out according to the procedures for the primary sub constitutional unit. The contents of the secondary sub constitutional unit are preferably within a range of ±3 mole % relative to the average content. It is more preferably within the range of the average ±2 mole %, and more preferably of average ±1 mole %. By suppressing the variations in the contents of the primary sub constitutional unit and the secondary sub constitutional unit, it becomes possible to provide the film uniformity in composition of the resulting film in the longitudinal direction of the film. The requirement (4) of the present invention defines a requirement of the variation of the solvent adhesion strength, one of physical properties that reflect the uniformity of film composition in its steady region.

Namely, the requirement (4) of the present invention is that in respect to a tubular film roll which is obtained by performing the steps of slitting the film in the steady region having stable physical properties along the longitudinal direction of the film at a certain internal in a transverse direction into film strips, folding the film strip transversely so as to overlap the corresponding transverse edges of the film strip, bonding the edges by the use of 1,3-dioxolane as an adhesion solvent to produce a tubular film, and winding the resulting tubular film in a flattened state, when a first cut-off point of samples of the tubular film roll is provided at a position 2 m or less inner from a termination end of the tubular film roll;

a final cut-off point is provided at a position 2 m or less inner from an initiation end thereof;

a plurality of additional sample cut-off points are provided at an interval of about 100 m from the first cut-off point;

the tubular sample obtained at each cut-off point is cut open into a film sample with a width of 15 mm; the film sample is placed in a tensile tester having chucks disposed at a distance of 50 mm in such a manner that the solvent adhesion portion of the film sample is located at the center between the chucks; and a solvent adhesion strength of the film sample is measured in a condition of a temperature of 23° C. and a tension test rate of 200 mm/min, the solvent adhesion strength of each film sample is 1N/15 mm width or more, and when an average of the solvent adhesion strength is calculated, the solvent adhesion strengths of all the film samples fall within a range of ±2N/15 mm width relative to the average.

In the requirement (4) above, the samples for solvent adhesion strength measurement are prepared according to procedures below. First, a heat-shrinkable film roll before shrinkage is placed in an environment controlled to a temperature of 30±1° C. and a relative humidity of 85±2%. After 250 hours of storage, in a tubing machine, the film in the film roll above is coated with 1,3-dioxolane in a line with a 2±1 mm width, a little inside from one edge of one surface thereof (coating amount: 3.0±0.3 g/mm$^2$), and immediately the film is folded so that the edges thereof are adhered to each other, thus yielding a tubular film. The tubular film is flattened and rewound into a roll. The first cut-off point of samples is provided at a position 2 m or less inner from the termination end of winding, the final cut-off point is provided at a position 2 m or less inner from the initiation end of winding, and additionally a plurality of sample cut-off points are provided at an interval of about 100 m from the first cut-off point. Meanwhile, the heat shrinkage percentage of the sample film in the neighborhood of each cut-off point is determined to confirm that the film is in the steady region wherein physical properties of the film are stable. The size of the sample for measurement of the solvent adhesion strength is not particularly limited, but since the longitudinal direction of the tubular film corresponds to the transversal direction of the sample and the width of the sample is 15 mm, it is favorable to cut of a sample with a width of 150 mm or more along the longitudinal direction so that about 10 samples can be obtained. Each of the tubular samples thus obtained is then cut in the area except the solvent adhesion portion to give a film-shaped sample with a length of about 100 mm and a width of 15 mm. The film sample is used for measurement of the solvent adhesion strength. It is desirable to prepare about 10 samples for each of the cut-off points.

The solvent adhesion strength can be determined by setting the sample so that the solvent adhesion portion thereof is placed at the center between chucks of the tensile tester (a distance between chucks of 50 mm) and by conducting the tensile test in a condition of a temperature of 23° C., a tension test rate of 200 mm/min. An average of the solvent adhesion strength is calculated in respect to each cut-off point (when 10 samples were prepared and the solvent adhesion strengths thereof are measured, an average of 10 samples), the average is regarded to represent the solvent adhesion strength of the sample from each of the cut-off points. Additionally, an average of the solvent adhesion strength of all the samples is also calculated.

To satisfy the requirement (4), solvent adhesion strengths of all the samples should be 1N/15 mm width or more. Insufficient solvent adhesion strength below 1N/15 mm width causes incidence of defects such as separation of the adhesion portion after the tubular film is converted to products such as labels and bags. The lower limit of the solvent adhesion strength is more preferably 1.5N/15 mm width or more. Alternatively, too stronger solvent adhesiveness occassionally causes defects in appearance, e.g., loss of planarity and corrugation of the solvent adhesion portion of the film due to swelling thereof resulting from penetration of the solvent, and thus the solvent adhesion strength of all the samples is favorably 8.0N/15 mm width or lower, preferably 7.0N/15 mm width or lower. Meanwhile, the reason for the solvent adhesion strength being expressed in an unit of "N/15 mm width" is that the width of the test sample is 15 mm.

In addition to the above to fulfill the requirement (4), when an average of the solvent adhesion strength of all the samples is calculated, all solvent adhesion strengths of all the samples should fall within a range of ±2N/15 mm width relative to the average. A film which does not satisfy this requirement has areas where the solvent adhesion strength is not sufficient and areas where it is too large. Therefore, such tubular films obtained by solvent adhesion are not favorable as the areas thereof where the solvent adhesion strength is not sufficient are easily separated, while the areas where the solvent adhesion strength is too large causes defects in appearance of the products due to the loss of planarity by swelling of the adhesion portion. The solvent adhesion strength of each sample is preferably in a range of the average ±1.8N/15 mm width, more preferably of the average ±1.6N/15 mm width.

The absolute value of the average of the solvent adhesion strength of each sample is favorably 2.5N/15 mm width or more. It is preferably 3N/15 mm width or more, and more preferably 3.5N/15 mm width or more.

By suppressing the variation in the solvent adhesion strength of a long film in the range described above, it becomes possible to decrease incidence of defects, either insufficient in the solvent adhesion strength or inferior in appearance, in the products such as labels and bags produced from the tubular films which, in turn, are produced from the film above by solvent adhesion.

While 1,3-dioxolane is used as the adhesion solvent for determining the solvent adhesion strength, the other solvents may be used for actual production of the tubular films. More specifically, examples of the solvent include aromatic hydrocarbons such as benzene, toluene, xylene, trimethylbenzene, etc.; halogenated hydrocarbons such as methylene chloride, chloroform, etc.; phenols such as phenol, etc.; furans such as tetrahydrofuran, etc. and mixtures thereof.

Additionally, by suppressing the variations in the contents of the primary sub constitutional unit and the secondary sub constitutional unit, it becomes possible to decrease the variation in glass transition temperature. The requirement (5) of the present invention defines the variation in the glass transition temperature that represent the uniformity in composition of the film in the steady region. Namely, the requirement (5) of the present invention is that when a glass transition temperature of the sample properly cut off from each of the cut-off points defined in the requirement (1) of claim 1 is determined and an average of the glass transition temperatures is calculated, the glass transition temperatures of all the samples fall within a range of ±4° C. relative to the average.

A film having large variation in the glass transition temperatures along the longitudinal direction provides a tubular film having large variation in the Tg along the longitudinal direction. The large variation in Tg often causes cutting defects in the cutting process of the tubular film into labels, since the portions having high Tg can not be cut easily. On the other hand, during a long operation of the cutting machine in the cutting process, cutting blades in the cutting machine becomes gradually heated, which causes heat-fusion of a portion having low Tg in the tubular film in the cutting region and thus results in defects in openings of the resulting labels. Thus, the requirement (5) defines that the variation in Tg of the long film should fall within a range of ±4° C. relative to the average.

The method for obtaining samples for measurement of Tg in the requirement (5) is same as that described in the requirement (1). 10 mg of the sample is sufficient for the measurement of Tg. Specifically, a sample cut off (10±1 mg) is heated at 300° C. for 2 minutes and then immediately quenched in liquid nitrogen. The sample is placed and analyzed in a differential scanning calorimeter (DSC), and the Tg can be determined from a DSC pattern obtained in the equipment above raising the temperature from −40° C. to 300° C. at a speed of 20° C./min. The glass transition temperature (Tg) is a temperature at an intersection of tangent lines of the endothermic starting curve of the DSC pattern before and after the endothermic starting curve.

Since a long film in a roll fulfilling the requirement (5) above has a high level of uniformity in Tg along the longitudinal direction of the film, when the film is slit and turned to a long tubular film, the resulting tubular film also has a high uniformity in Tg along the longitudinal direction. Thus, when the tubular film is further cut into a plurality of labels, it becomes possible to prevent the heat-fusion in the cutting region having low Tg, and to prevent the incidence of defects in openings of the resulting labels. Additionally, it also enables to prevent the incidence of cutting failure in a portion having high Tg, and to increase the overall yield in the label producing process.

The long film in the film roll of the present invention described above is a film fulfilling the requirements (1) and (2) above the requirement (1) and (3), the requirements (1) and (4), or the requirement (1) and (5). Namely, a film roll of a film fulfilling requirement (1) as well as one of the requirements (2) to (5) is the film roll of the present invention. The film roll of the present invention is preferably a film roll of a film that meets two or more of the requirements (2) to (5) as well as the requirement (1), more preferably of a film that meets all of the requirements (1) to (5).

The long film of the present invention is low in variation in composition thereof as described above, decreasing the frequency of the incidence of defects in the solvent adhesion process, the cutting process, and the heat shrinkage process. In case that a film having the variation in heat shrinkage properties more strictly controlled is favorable, the film preferably meets one of the requirements (6) to (8) below as well.

The requirement (6) is that when the average of the heat shrinkage percentage in the maximum shrinkage direction of the samples is calculated as described in the requirement (1), the heat shrinkage percentage of each sample falls within a range of ±5% relative to the average.

The long film of the present invention has the heat shrinkage percentages in the maximum shrinkage direction of 20% or more as described in the requirement (1). A film further fulfilling the requirement (6) above that the heat shrinkage percentage of each sample fall within a range of the average±5% is uniform in the heat shrinkage percentage over entire length thereof, and thus leads to a decrease in the incidence of defects in the wrapping and shrinking process and to a drastic drop in the defective fraction of the final products due to small variation in the heat shrinkage percentage of respective products such as labels, bags and so on. The variation in the heat shrinkage percentage is preferably in a range of the average±3%, and more preferably of the average±2%.

The requirement (7) is that when a heat shrinkage stress value in the maximum shrinkage direction of each of the samples cut off from the cut-off points described in the requirement (1) is determined in a condition of a temperature of 90° C., a flow rate of hot air of 5 m/sec, a sample width of 20 mm, and a distance between chucks of 100 mm, the maximum values of the heat shrinkage stress of all the samples are 3.0 MPa or more, and when an average of the maximum values of the heat shrinkage stress is calculated, the maximum values of the heat shrinkage stress of all the samples fall within a range of ±1.0 MPa relative to the average.

Here, the maximum value of the heat shrinkage stress is determined specifically as follows.
(1) A sample with a length of 200 mm in the maximum shrinkage direction and a width of 20 mm is prepared.
(2) A hot-air oven in a tensile tester mounted with a hot-air oven (e.g., Tensiron manufactured by Toyoseiki) is heated to 90° C.
(3) Hot air supply is terminated and the sample is placed in the heating oven. Distances between the corresponding chucks are 100 mm (constant).
(4) After the door of the heating oven was immediately closed and the supply of hot-air (90° C., at a rate of 5 m/s) was resumed, the heat shrinkage stress is measured.
(5) The maximum value obtained from the resulting chart of the heat shrinkage stress is regarded as the maximum value of the heat shrinkage stress (MPa).

A film with the maximum value of the heat shrinkage stress of below 3.0 MPa is not favorable since the film often gives rise to defects in appearance due to the insufficient shrinkage stress and to problems of insufficient anti-breaking property due to insufficient mechanical strength thereof. The lower limit of the maximum value of the heat shrinkage stress is more preferably 3.5 MPa, and furthermore preferably 4.0 MPa. Further, from the maximum values of the heat shrinkage stress obtained as described above, an average is calculated and the variation of the maximum values of the heat shrinkage stress is determined. When the variation of the maximum values of the heat shrinkage stress is in a range from ±1.0 MPa to ±0.5 MPa relative to the average, defective fraction in the wrapping and shrinking process can be decreased by-properly adjusting the condition. Further, the variation in the maximum values of the heat shrinkage stress is in a range of the average±0.5 MPa, the adjustment above is not required and the products such as labels, bags and the like with a excellent heat shrinkage properties can be produced. The variation in the maximum values of the heat shrinkage stress is more preferably in a range of ±0.4 MPa relative to the average. Meanwhile, the absolute value of the average of the maximum values of the heat shrinkage stress is preferably 4.0 MPa or more. The lower limit of the average is more preferably 4.5 MPa, and furthermore preferably 5.0 MPa.

The requirement (8) is that when the each square sample of 10 cm×10 cm cut off from each of the cut off points described in the requirement (1) is immersed in hot water at 85° for 10 seconds, subsequently in water at 25° C. for 10 seconds, and withdrawn, heat shrinkage percentages in the direction orthogonal to the maximum shrinkage direction of all the samples are 7% or less, and when an average of the heat shrinkage percentages in the orthogonal direction is calculated, the heat shrinkage percentage of each sample in the orthogonal direction falls within a range of ±2% relative to the average.

The requirement (8) is a requirement of a film that does not have a defect in appearance, i.e., uneven shrinkage in the direction orthogonal to the maximum shrinkage direction. Here, "uneven shrinkage" means that the length of the label after shrinkage is uneven, and leads to a defect in appearence. For example, an uneven label wrapped and shrunk around a PET bottle or the like has a top edge line of the label fallen downward or a bottom edge line curved upward.

The heat shrinkage percentage in the direction orthogonal to the maximum shrinkage direction (orthogonal heat shrinkage) over 7% often gives rise to defects in appearance due to the uneven shrinkage. The orthogonal heat shrinkage percentage is more preferably 6% or less, and furthermore preferably 5% or less.

Additionally, by suppressing the variation in the heat shrinkage percentages in the direction orthogonal to the maximum shrinkage direction of a heat-shrinkable film roll in a range of ±2% relative to the average of the orthogonal heat shrinkages, the variation in heat shrinkage of labels, bags or the like becomes smaller, thus leading to a decrease in the incidence of defects in appearance due to the uneven shrinkage in the wrapping and shrinking process, and to a drastic drop in the defective fraction of the final products. The variation in the orthogonal heat shrinkage percentages is preferably in a range of ±1.8% relative to the average of the heat shrinkage percentages, more preferably of the average±1.5%, and most preferably of the average±1%.

A long film fulfilling the requirement (1) as well as one of the requirements (6) to (8) above is low in the variation in heat shrinkage properties thereof, enabling a drastic drop in the incidence of defects due to insufficient shrinkage, shrinkage shading, whitening, crinkling, deformation, uneven shrinkage, etc. A film fulfilling the requirement (1), the requirement (6) or (7), and the requirement (8) is more preferable, and a film fulfilling the requirement (1) and all of the requirements (6) to (8) is furthermore preferable.

Since a low variation in composition of the film is favorable to suppress the variation in heat shrinkage properties, a film fulfilling the requirement (1), one of the requirements (2) to (5) above, and one of the requirements (6) to (8) is more preferable. A film fulfilling the requirement (1), two or more of the requirements (2) to (5), and two or more of the requirements (6) to (8) is furthermore preferable, and a film fulfilling all of the requirements (1) to (8) is most preferable.

Hereinafter, a favorable process for producing the long film having uniform compositions and uniform heat shrinkage properties over entire length will be described.

Generally, heat-shrinkable polyester films are produced by employing the method to combine a major constitutional unit with one or more sub constitutional units and thus modulate the properties thereof, for example, by blending two or more polymers of different kinds and compositions or by copolymerizing a plurality of monomers, for the purpose of obtaining a polymer having a well balanced properties of the heat shrinkage and the physical properties such as the tensile strength. To introduce one or more sub constitutional units into the film, a method to use a single copolymer prepared by copolymerization and a method to blend a plurality of homopolymers or copolymers of different kinds are often practiced.

In the method of using a single copolymer, it is less likely that a large variation in film composition of the resulting long film wound into a roll may happen, and thus it may be easy to produce a film roll which meets the requirements (2) to (5) of the present invention, but difficult to produce a film roll which meets the requirements (6) to (8) since the heat shrinkage properties often varies according to the drawing condition.

On the other hand, the blending method is widely used in industry, since it enables facile modification of the film properties only by changing the blending ratio of raw polymers, and thus is adaptable for industrial production of a variety of films. Since it is known that the variation in composition of a film in a roll is rather large when the blended polymers are used as raw materials, it is favorable to employ the following procedures to obtain the film roll that meets the requirements defined in the present invention.

(i) Uniformization of Chip Shapes

In the blending method, a plurality of raw polymer chips of different compositions are usually blended in a hopper and conveyed into an extruder, where the polymer is extruded in a molten state into film. In a case where three polymer chips are used as raw polymers, for example, the chips are respectively supplied, continuously or intermittently, into 3 separate hoppers. The polymer chips are then conveyed, via a buffering hopper if necessary, finally to a hopper immediately above an extruder (hereinafter, referred to as a final hopper for convenience), wherein the chips are blended. The blended raw chips are supplied into the extruder quantitatively according to the discharge rate and then processed into film. The present inventors have found uneven supply of raw chip, i.e., that the composition of the chips supplied from the final hopper into the extruder varies depending on a case as to whether the final hopper contains a large amount of chips or a small amount of chips, based on the capacity and the shape of the final hopper. The problem is especially prominent when the polymer chips have differences in their shapes or densities. Consequently, the uneven supply of raw chips leads to a large variation in polymer composition of the resulting long film.

Therefore, in producing a heat-shrinkable polyester film roll by including a steps of blending a mixture of a main polymer used in the greatest amount and one or more polymers different in compositions to the main polymers and extruding the resulting mixture, it is favorable to adjust shapes of the plurality of the polymer chips to suppress the uneven supply of raw chips in the final hopper, as means to decrease the variation in composition of the polymer constituents in the resulting film and thus to produce a film which meets the requirements described above, having a low variation in the properties thereof.

The raw chips for polyester films are usually produced in a process wherein a polymer in a molten state after polymerization is extruded as strands, which are immediately chilled in water and cut in a strand cutter. Therefore, the polyester chips are usually cylindrical members having an elliptical cross section. The present inventors have found that when the major and minor axes (mm) of the elliptic cross section and the lengths of the raw polymer chips of minor constituents to be blended with the polymer chips of the main constituent are, respectively, in ranges of the average±20% of those of the major constituent raw chips, the incidence of the uneven supply of raw polymer chips as described above can be reduced. More preferably, those values are, respectively, within ranges of the average±15%.

When there is a large difference in the size of chips, smaller chips tend to sink during the chips being moved downward in the final hopper, making the ratio of the larger chips higher when the amount of the remaining chips in the final hopper becomes smaller, thus resulting in the uneven supply of raw materials. However, by using the chips fulfilling the requirement above, the uneven supply of raw material can be reduced and consequently a long film having a uniform film composition can be obtained.

(ii) Optimization of Hopper Shape

While an extruder is used for producing a film, optimization of the shape of the final hopper is also a favorable step for obtaining a film having a uniform composition. Namely, when the inclination angle of the funnel-shaped hopper is smaller than 65°, only small chips can move downward, resulting in the uneven supply of the raw materials. By using a hopper having the inclination angle of more than 65°, it becomes easy to move larger and smaller chips alike downward in the hopper, keeping the upper edge of the content (chips) horizontal, and reducing the uneven supply of raw materials. The inclination angle is more preferably 70° or more. Here, the inclination angle of the hopper is an angle between an oblique line of the hopper and a horizontal line. A plurality of hoppers may be installed upstream to the final hopper, and in such a case, the inclination angles of all the hoppers are favorably larger than 65° or more, more preferably 70° or more.

(iii) Optimization of Hopper Volume

As means of reducing the uneven supply of raw materials in the hopper, it is also advantageous to optimize the hopper volume. The optimal capacity of the hopper is in a range of 15 to 120 mass % of a discharge rate of the extruder per hour. It is due to the fact that with a hopper not having a capacity of about 15 mass % or more, stable supply of the raw materials becomes difficult, while in a hopper having a too large capacity, the raw chip mixture stays in the hopper for a long time, possibly causing the uneven supply of the chips. The hopper volume is more preferably in a rage of 20 to 100 mass % of the discharge rate of the extruder per hour.

(iv) Reduction of Fine Powders

It is also advantageous to reduce the amount of fine powders that are produced by mutual grinding of chips or the like, for obtaining a long film having a uniform composition. Since the fine powders also contribute for incidence of raw material uneven supply, it is favorable to remove the fine powders generated in the production processes, and to reduce the amount of the fine powders in the hopper. The ratio of the fine powders in the raw material (100%), is favorable to be controlled within 1 mass %, throughout the processes before the raw chip reaches the extruder, more preferably within 0.5 mass %. Specifically, the fine powders can be removed, for example, by way of sieving the chips and of air conveying the raw chips via a cyclone air filter after chopping the chips in the strand cutter.

(v) Uniformization of Film Surface Temperature in Drawing Process

Factors contributing to the variation in heat shrinkage properties of a long film include the variation in the operational parameters in the drawing process, as well as the variation in the polymer compositions constituting the film described above. Therefore, it is advantageous to control a variation in temperature in the drawing process and thus to reduce the variation in surface temperature of the film being drawn as much as possible.

In the case of monoaxial drawing of a polyester film in the transverse direction in a tenter, there are steps; the preheat step before drawing, the drawing step, the heat-treating step following drawing, the relaxation step, and the redrawing step, etc. Especially, heat control in the preheating step, the drawing step, and the heat-treating step after the drawing step is essential and it is favorable to control the variation of the surface temperatures of the film measured at any point in these steps above in a range of ±1° C. relative to the average temperature, for producing the film having uniform heat shrinkage properties. It is more favorable to control the temperature in a range of the average temperature ±0.5° C.

The variations in temperature in the preheating, drawing, and heat-treating steps affect greatly the variation in the heat shrinkage percentages (in the maximum shrinkage direction as well as the direction orthogonal thereto) and the maximum values of the heat shrinkage stress of the resulting drawn film. Therefore, smaller the variation in the surface temperature of the film in these steps, more uniform the heat shrinkage properties of the drawn film, since the film is drawn and heat-treated at a same temperature over the entire length. It is needless to say that smaller variations in surface temperature of the film during the relaxation and redrawing steps are also favorable.

The variation in the film surface temperatures can be reduced, for example, by using a blower mounted with an inverter which can strictly control the supply of the hot air to be used for heating of the film, or by using an equipment which can suppress the variation in temperature of the hot air by the use of low-pressure steam of 500 kPa or less (5 kgf/cm$^2$ or less) as a heat source.

The variation in the surface temperature of the film measured at any point is a variation in the surface temperature of the film measured continuously during production thereof at a point, for example, 2 m from the entrance of the drawing process by using e.g., a non-contact surface thermometer. After production of 1 roll of film, average temperatures can be calculated. If the resulting variation in the film surface temperature fall in a range of ±1° C. relative the average temperature, the film is regarded to be drawn in a same condition over the entire length of the film in the steady region, and to be low in the variation in the heat shrinkage properties.

For the purpose of producing a long film having uniformity in composition, only one of the procedures (i) to (iv) above will be required. It is more favorable to employ 2 or more of the 4 procedures, and furthermore preferable to employ all of the procedures (i) to (iv). Accordingly, it is favorable to extrude a film, by reducing fine powders by the procedure (iv), by using raw chips in sizes defined in the procedure (i), by blending each raw chips in a hopper having a inclination angle of 65° or more as described in the procedure (ii), and having a volume fulfilling the requirement in the procedure (iii), by supplying the blended chips continuously into an extruder, and by extruding at a controlled discharge rate. Additionally, the raw chips may be premixed and fed, via intermediate (buffer) hoppers, to the final hopper, and then supplied to the extruder. A plurality of raw chips may be blended in a hopper by quantitatively supplying the raw chips thereto, or premixed for example by the use of a blender or the like. In the latter case, it is favorable to pay attention to the size of the raw chips so that the uneven supply of the mixture may not happen during the discharge.

It is favorable to employ the procedure (v) above as well as the procedures (i) to (iv) above for suppressing the variation in the heat shrinkage properties of the long film.

Specific examples of the production of the polyester film will be described below. First, raw chips processed into a shape to meet the description in the procedure (i) are dried in a drier such as a hopper drier, a paddle drier, etc., or in a vacuum dryer, and extruded into a film at 200 to 300° C. Alternatively, the undried polyester raw materials are processed in a bent-type extruder into a film while water therein is removed simultaneously. The extrusion may be conducted by any methods known in the art, such as the T-die method, a tubular method, and so on. The polymer extruded is cooled (rapidly chilled) on a casting roll, to give an undrawn film. The "undrawn film", mean while, contains the film where a tension is applied for conveying the film.

The undrawn film is then subjected to a drawing treatment. The undrawn film cooled on the casting roll above may be drawn successively in the following drawing process, or wound once into a roll and then drawn.

As it is practical from a viewpoint of the production efficiency to attain the object of the present invention, that the maximum shrinkage direction is the traverse (width) direction of the film, an example of the drawing method when the maximum shrinkage direction is the traverse direction will be described below. But it is also possible to draw the undrawn film to give a film having the maximum shrinkage direction identical with the machine (length) direction of the film, according to common methods, for example, by changing the drawing direction for an angle of 90°.

In respect to the uniformization of the variation in thickness of the desired heat-shrinkable polyester film, the film is preferably heated in a preheating step, prior to the film being drawn in the traverse direction, for example, in a tenter in the drawing step, and in the preheating step, the undrawn film is preferably heated under a low hot-air supply so that the thermal conductance does not exceed 0.0013 cal/cm$^2$·sec·° C. and the film surface temperature becomes in a range of Tg+0° C. to Tg+60° C.

The film is drawn 2.3 to 7.3 times, preferably 2.5 to 6.0 times in the traverse direction at a temperature in a range of Tg−20° C. to Tg+40° C. Subsequently, the film is heat-treated, while being stretched for 0 to 15% or relaxed for 0 to 15%, at a predetermined temperature in a range of 60° C. to 110° C., and further heat-treated if desired at a predetermined temperature in a range of 40° C. to 100° C., to give a heat-shrinkable polyester film. It is preferable to use equipment that can reduce the variation in the film surface temperature in the traverse drawing step as described above.

The film may also be drawn 1.0 to 4.0 times, preferably 1.1 to 2.0 times in the longitudinal direction, as well as in the traverse direction by the tenter. The film may be biaxial drawn, either by sequential or simultaneous biaxial drawing, and the film may be further redrawn if desired. In the sequential drawing, the film may be drawn in any of the orders of direction, from traverse to longitudinal, from longitudinal to traverse, from longitudinal, traverse and to longitudinal, and from traverse, longitudinal to traverse and so on. When the film is drawn in the longitudinal direction or biaxially drawn, it is also favorable to reduce the variations in the film surface temperature as much as possible in the preheating and drawing steps, similarly to the traverse drawing step.

To suppress internal exothermic heat generation associated with the drawing and reduce the variation of temperature in the traverse direction, the thermal conductance in the drawing process is preferably maintained at 0.0009 cal/cm$^2$·sec·C or more, more preferably at 0.0013 to 0.0020 cal/cm$^2$·sec·° C.

A film produced from polyester resins is employed for the film roll of the present invention, since the film has an excellent product heat shrinkage in a wide range of temperature from low to high in the heat shrinkage process, and provides products having an excellent appearance with fewer shrinkage shading, whitening, crinkling, and deformation after heat shrinkage, and having excellent luster and transparency, especially in relatively lower temperature range.

As the polyester resins, (co)polyesters known in the art, prepared by copolycondensation of 1 or more polybasic carboxylic acid components such as aromatic dicarboxylic acids, aliphatic dicarboxylic acids, or ester forming derivatives thereof, and a polyhydric alcohol component may be used. Examples of the aromatic dicarboxylic acid include terephthalic acid, isophthalic acid, naphthalene-1,4- or -2,6-dicarboxylic acid, 5-sodium sulfoisophthalic acid, etc. Examples of the aliphatic dicarboxylic acid include dimer acid, glutaric acid, adipic acid, sebacic acid, azelaic acid, oxalic acid, succinic acid, etc. Additionally, hydroxycarboxylic acids such as p-hydroxybenzoic acid or the like, and polyvalent carboxylic acids such as trimellitic anhydride, pyromellitic anhydride, etc., may also be used if necessary. Terephthalic acid, isophthalic acid, naphthalene-1,4- or -2,6-dicarboxylic acid is favorable. Further, examples of the ester-forming derivative are derivatives such as dialkylesters, diarylesters, acid halides, etc.

Examples of the polyhydric alcohol component include alkylene glycohols such as ethylene glycol, diethylene glycol, dimer diol, propylene glycol, triethylene glycol, 1,4-butanediol, neopentyl glycohol, 1,4-cyclohexane dimethanol, 1,6-hexanediol, 3-methyl-1,5-pentanediol, 2-methyl-1,5-pentanediol, 2,2-diethyl-1,3-propanediol, 1,9-nonanediol, 1,10-decanediol, etc., bisphenol compounds or alkyleneoxide adducts of the derivatives thereof, trimethylol propane, glycerin, pentaerythritol, polyhydroxytetramethylene glycohols, polyethyleneglycol, etc. Additionally, ε-caprolactone may also be used for preparation of the polyester.

The major constitutional unit of the polyester is favorably ethylene terephthalate unit from a viewpoint of anti-breaking property, tensile strength, heat resistance, etc., of the resulting film.

On the other hand, the sub constitutional unit may be selected from any units, for example, a unit having propyleneglycol as a polyhydric alcoholl component, a unit having isophthalic acid as a polybasic carboxylic acid component, etc., except an ethylene terephthalate unit. However, a unit selected from a group consisting of units of 1,4-cyclohexane dimethanol and terephthalic acid, of neopentyl glycohol and terephthalic acid, and of 1,4-butanediol and terepbthalic acid is preferable as the sub constitutional unit. Incorporation of the sub constitutional units into the polyester provides the resulting film a good solvent adhesion property, a good heat-shrinkage force at temperatures from low to high, and an excellent appearance of the final products after shrinkage. 1,4-Cyclohexane dimethanol and neopentyl glycohol have ability of making amorphous part in the resulting polyester and accordingly to increase the heat shrinkage properties of the products. Therefore, the primary sub constitutional unit is most preferably a unit consisting of 1,4-cyclohexane dimethanol and terephthalic acid or a unit consisting of neopentyl glycohol and terephthalic acid. Alternatively, these units are combined at an equal amount, and the mixture may be used as the primary sub constitutional unit.

On the other hand, an unit consisting of 1,4-butanediol and terephthalic acid decreases the glass transition temperature of the film, and thus contributes to the exhibition of heat-shrinkage force at a lower temperature, but too much addition thereof occasionally leads to a decrease in the film strength and others, so the unit is favorably used as the secondary sub constitutional unit, rather than as the primary sub constitutional unit.

The polyester film having the favorable composition described above may be produced by a combination of, for example, (i) polyethylene terephthalate (PET) and polycyclohexylene dimethylenterephthalate, (ii) polyethylene terephthalate (PET) and a homopolymer from neopentyl glycohol and terephthalic acid, (iii) polyethylene terephthalate (PET) and polybutylene terephthalate (a homopolyester from 1,4-butanediol and terephthalic acid), (iv) 4 homopolymers above, or (v) PET and a copolyester consisting of a mixed diol comprising 1 or more diols selected from the group of neopentyl glycohol, 1,4-cyclohexane dimethanol and 1,4-butanediol, (if necessary, ethylene glycol may be also added), and terephthalic acid. Namely, chips of the homopolyester or the copolyester are first produced separately and blended according to the examples of the combination above. Meanwhile, a combination of homopolyesters with different compositions or a combination of a homopolyester and a copolyester does not cause problems such as whitening or the like of the resulting film due to the poor compatibility between polymers. This is because of the fact that these polymers are significantly heated in an extruder in the blending and melting process, so that ester exchange reactions between the raw polyesters therein convert the polymer mixture into a mixture of copolyesters having similarity in composition before the polymer mixture is discharged from the extruder. This is also confirmed by the fact that the resulting film has only one peak indicating Tg in the DSC pattern thereof.

The polyester can be prepared according to any common melt-polymerization methods, including the so-called direct polymerization method, i.e., polycondensation of oligomers obtained by a direct reaction of a polybasic carboxylic acid component and a polyhydric alcoholl component, and the so-called ester exchange method, i.e., ester exchange reaction of a polybasic carboxylic acid dimethyester component and a polyhydric alcoholl component and subsequent polycondensation, any method including above may be applicable. The polyester may be obtained by other polymerization processes. The degree of polymerization of the polyester is preferably 0.3 to 1.3 dl/g as an intrinsic viscosity.

To the polyester may be added polymerization catalysts such as antimony oxide, germanium oxide, titanium compounds, etc., and additionally, additives for prevention of disadvantages including coloring, gelation and the like, for example, Mg salts such as magnesium acetate, magnesium chloride, etc., Ca salts such as calcium acetate, calcium chloride, etc., Mn salts such as manganese acetate, manganese chloride, etc., Zn salts such as zinc chloride, zinc acetate, etc., and Co salts such as cobalt chloride, cobalt acetate, etc., respectively at concentrations of 300 ppm (mass ratio, same hereinafter) or less as metal ions with respect to the polyester, and phosphoric acid or phosphoric ester derivatives such as phosphoric trimethylester, phosphoric triethylester, etc., at concentrations of 200 ppm or less as phosphorus (P).

It is not favorable to add metal ions at a concentration of higher than 300 ppm as total metal ions excluding the polymerization catalysts, or to add phosphorus derivatives at a concentration of higher than 200 ppm as the total amount of P, since the resulting polymer becomes markedly colored and reduced in the heat resistance and anti-hydrolysis property.

Here, the mass ratio (P/M) of the total phosphorus (P) and the total metal ions (M) is preferably 0.4 to 1.0, from a viewpoint of heat resistance, anti-hydrolysis property or the like of the resulting film. When the mass ratio (P/M) is below 0.4, or above 1.0, the resulting film becomes more colored or mixed with large particles, and thus not favorable.

The metal ions and phosphoric acid or the derivatives thereof may be added at any time, but generally, the metal ions are preferably added when raw materials of the polyesters are added, i.e., before the ester exchange or the direct esterification reaction, and the phosphoric acid derivatives are preferably added before the polycondensation reaction.

Additionally, fine particles of silica, titanium dioxide, kaolin, calcium carbonate or the like may be added, and further, antioxidants, UV absorbents, antistatic agents, coloring agents, antibacterial agents may also added if desired.

The film roll of the heat-shrinkable polyester film of the present invention is preferably a roll of the heat-shrinkable polyester film with a width of more than 0.2 m and a length of 300 m or more, wound around a winding core. A roll of the film with a width of less than 0.2 m has a low value industrially, and a film roll of the film with a length below 300 m has basically a low variation in the composition and heat shrinkage properties since the film is short, and the merits of the present invention may not be effectively expressed. The heat-shrinkable polyester film roll has more preferably a film with a width of more than 0.3 m, furthermore preferably of more than 0.4 m. Additionally, the length of the heat-shrinkable polyester film in the roll is more preferably 400 m or more, furthermore preferably 500 m or more.

The upper limit of the width of the film roll is usually, but is not particularly limited to, less than 1.5 m respectively, from a viewpoint of convenience in handling. Further the favorable upper limit of the length of the film roll is 6000 m in the case of a film having a thickness of 45 μm. Examples of the winding core are plastic, metal or paper cores with diameters of 3 inch, 6 inch, 8 inch, etc.

Further the thickness of the film of the heat-shrinkable polyester film roll of the present invention is, but not limited to, preferably 10 to 200 μm, more preferably 20 to 100 μm as the heat-shrinkable polyester film for labels.

Example

Hereinafter, the present invention will be described in detail in reference to EXAMPLES, these EXAMPLES are not intended to limit the scope of the present invention, and modifications within the spirit and scope of the present invention are also embraced by the present invention. Physical properties of films obtained in EXAMPLES and COMPARATIVE EXAMPLES were determined according to the following procedures.

(1) Confirmation of Steady State and Location of Sample Cut-Off Points

Five samples of film were cut off from a film roll of a 1000 m film prepared in each EXAMPLE or COMPARATIVE EXAMPLE below at an interval of 20 m from the second end (termination end of winding) thereof, and other five samples were cut off at an interval of 20 m from a position 200 m inside from the first end (initiation end of winding) in the direction to the first end, and these samples were subjected to a measurement (to be discussed later) of the heat shrinkage percentage in the maximum shrinkage direction. The variation in the heat shrinkage percentage thereof was in a range of 20%. Additionally, these films were produced stably both in the casting and drawing processes. Thus, it was found that the film in each film roll above corresponded to the steady region over entire length of the film.

In all measurements except for the solvent adhesion strength, the first cut-off point of samples was fixed at the second end (0 m from the termination end of winding) of the respective film above, and the final cut-off point was fixed at the first end (0 m from the initiation end of winding), and thus samples for measurement were obtained from 11 cut-off points altogether. In each of measurement of properties, 10 samples were obtained from each of the cut-off points, and an average value of the property determined from the 10 samples was regarded as the property representing the sample at the cut-off point.

(2) Content of Primary Sub Constitutional-Unit (Mole %)

Each sample was dissolved in a mixed solution of chloroform D (produced by Euriso-top) and trifluoroacetic acid D1 (produced by Euriso-top) at a ratio of 10:1 (volume ratio), and proton NMR of the resulting sample solution was measured by NMR (GEMINI-200; produced by Varian) under a condition of a temperature of 23° C. and of an integration number of 64. In the NMR measurement, from peak intensities of the predetermined protons, an amount of neopentyl glycohol, 1,4-cyclohexanedimethanol, or 1,4-butanediol in polyhydric alcohoII components 100 mole %, or an amount of isophthalic acid was determined, and thus content of the primary sub constitutional unit (mole %) in the total constitutional units (100 mole %) was calculated.

In TABLE 2, theoretically calculated values of the constitutional units in each sample were summarized. Additionally in TABLE 3 are shown an average, the maximum value and the minimum value, and their differences from the average. The average (A) indicates an average of the content of the primary sub constitutional unit (mole %) determined from all the samples, the maximum value (Bmax) indicates the maximum value of the content in samples from each cut-off point, and minimum value (Bmin) indicates the minimum value of the content in samples from each cut-off point, respectively.

(3) Content of Secondary Sub Constitutional-Unit (Mole %)

The content was determined according to the procedure for the primary sub constitutional-unit. The results are shown in TABLE 4.

(4) Solvent Adhesion Strength

A film in a film roll was slit over the entire length to give a film with a width of 273 mm, which was rewound into a roll. The resulting film roll was stored for 250 hours in an environment controlled to a temperature of 301° C., and a relative humidity of 85±2%. Subsequently, the film was printed with 3 different color inks, dark green, gold, and white, manufactured by Toyo Ink Mfg., and coated with 1,3-dioxolane in a line of a 2±1 mm width, a little inside from one edge of one surface thereof by a tubing machine, (coating amount: 3.0±0.3 g/mm$^2$), and immediately the film was folded to make both edges superimposed and adhered to each other, yielding a tubular film (processing rate: 80 mm/min). The tubular film was flattened and rewound into a roll.

Samples were cut off from the tubular roll. First cut-off point of the samples was at the termination end of winding (0m from the termination end of winding). Last cut-off point thereof was at the initiation end of winding (0m from the initiation end of winding), and 11 samples were collected altogether. The tubular sample thus obtained from each cut-off point was further cut open to give a film sample having the adhesion portion at the center thereof. From this film sample, test pieces (n=10) with a 100 mm length and a 15 mm width were cut off, and a film test piece was placed in a tensile tester, distance between chucks being previously adjusted to 50 mm, ("STM-T", manufactured by Baldwin), so that the solvent adhesion portion is placed at the center between the corresponding chucks. The tensile test was conducted at a condition of a temperature of 23° C. and a tension test rate of 200 mm/min, and the peeling strength of the adhesion portion was determined and designated as the solvent adhesion strength. The results are shown in TABLE 5.

(5) Glass Transition Temperature

A sample (10±1 mg) was heated at 300° C. for 2 minutes and immediately quenched in liquid nitrogen. DSC pattern of the sample was obtained in a DSC apparatus of Seiko Instrument Inc. (Model: DSC220), by raising a temperature form −40° C. to 300° C. at a rate of 20° C./min, to give glass transition temperature (° C.) thereof. The glass transition temperature (Tg) was determined from a temperature at an intersection of tangent lines of the endothermic starting curve of the DSC pattern before and after the endothermic starting curve. The results are shown TABLE 6.

(6) Heat Shrinkage Percentage in Maximum Shrinkage Direction

A film was cut along the longitudinal direction and the orthogonal direction to give a 10 cm×10 cm square sample. The sample was immersed in hot water at 85° C.±0.5° C. for 10 seconds under no load inducing heat shrinkage, and immediately thereafter immersed in water at 25° C.±0.5° C. for 10 seconds. Subsequently, lengths of the sample in the longitudinal and the orthogonal directions were determined and heat shrinkage was calculated according to the following equation.

Heat shrinkage percentage (%)=100×(Length before shrinkage−Length after shrinkage)/(Length before shrinkage)

A direction wherein the heat shrinkage is larger is regarded as the maximum shrinkage direction. The results are shown in TABLE 7.

(7) Product Appearance After Heat Shrinkage

All the tubular samples prepared in (4) but not used for the measurement of the solvent adhesion strength above, were further cut to give heat-shrinkable film labels. The heat-shrinkable film labels was wrapped around 0.9 L square column PET bottles, and the resultant label-wrapped PET bottles were moved through a steam tunnel manufactured by Fuji Astec Inc., (Type: SH-1500-L) in a condition of a staying time in the tunnel of 10 seconds and temperatures of 1st and 2nd zones of 80° C. and 90° C. respectively, and the appearance of the resulting labels was determined by visual examination. The appearance of the label after heat shrinkage was evaluated according to the following 5 rating scale, 5: best finish, 4: good finish, 3: with few defects (2 or less), 2: with defects (3 to 5), and 1: with many defects (6 or more), and the samples with the rating scale of 4 or more were regarded as satisfactory, and those of 3 or less defective. Heat shrinkage defective fraction (%) was calculated according to the following equation. Herein, the defects are, for example, crinkling, folding of label edge, color shading, and low shrinkage. The results are shown in TABLE 7.

Heat-shrinkage defective fraction=100×(number of defective samples)/(number of total samples).

(8) Maximum Value of the Heat Shrinkage Stress.

A sample of lengths of 200 mm in the maximum shrinkage direction and 20 mm in the orthogonal direction was prepared. The sample was placed in an oven previously heated to 90° C. and the supply of hot-air therein previously being terminated, of a tensile tester mounted with an hot-air oven (Tensiron manufactured by Toyoseiki). Distances between the corresponding chucks were 100 mm (constant). After the door of the heating oven was immediately closed and the supply of hot-air (90° C., at the rate of 5 m/s) was resumed, the heat shrinkage stress was detected and measured. A maximum value obtained from the resulting chart of the heat shrinkage stress was regarded as the maximum value of the heat shrinkage stress (MPa). The results were summarized in TABLE 8.

(9) Heat Shrinkage Percentage in the Direction Orthogonal to the Maximum Shrinkage Direction In the measurement of the heat shrinkage percentage in the maximum shrinkage direction described in (6), the heat shrinkage percentage in the direction orthogonal to the maximum shrinkage direction was also determined. The results are shown in TABLE 9.

Preparative Example 1

Synthesis of Polyester

In a stainless steel autoclave equipped with a stirrer, a thermometer, and a partially refluxing condenser, were added 100 mole % of dimethyl terephthalate (DMT) as a dicarboxylic acid component, and 68 mole % of ethylene glycol (EG) and 32 mole % of neopentyl glycohol (NPG) as polyhydric alcohol components, in a mole ratio of the polyhydric alcohol to the methylester at 2.2. Additionally, 0.05 mole % (with respect to the acid component) of zinc acetate and 0.025 mole % (with respect to the acid component) of antimony trioxides were added, respectively, as an ester exchange catalyst and as a polycondensation catalyst. The ester exchange reaction was conducted by distilling off methanol generated therein. Subsequently, polycondensation reaction was conducted at 280° C. under a reduced pressure of 26.7 Pa. Polyester thus obtained was extruded in a molten state from the polymerization equipment into strands, which were immediately chilled in water and cut by a strand cutter to give raw chip A. Slightly smaller chip to be used in a COMPARATIVE EXAMPLE was also prepared by changing the cutting condition. This chip was designated, as raw chip B. Intrinsic viscosities of chip A and chip B were 0.70 dl/g.

Meanwhile, the intrinsic viscosity was determined by the use of Ostwald viscometer at 30±0.1° C. in which accurately weighed 0.1 g of chip was dissolved in 25 ml of a solvent mixture of phenol:tetrachloroethane(3:2 by mass ratio). Intrinsic viscosity [η] is calculated according to the following equation (Huggins equation).

$$|\eta| = \lim_{C \to 0} \frac{\eta_{sp}}{C}$$

$$\frac{\eta_{sp}}{C} = |\eta| + k|\eta|^2 C$$

$$\eta_{sp} = \frac{t - t_0}{t_0}$$

Herein, $\eta_{sp}$ is a specific viscosity; $t_o$ is a solvent falling time in Ostwald viscometer; t is a solution falling time in Ostwald viscometer; and C is a concentration of the solution. In real measurement, the intrinsic viscosity was calculated by the following approximate equation, i.e., the Huggins equation wherein K is 0.375.

$$\eta_r = \eta_{sp} + 1 = \frac{t}{t_0}$$

$$|\eta| = \frac{1}{1.6}\{(\eta_r - 1) + 3 \times \ln\eta_r\}$$

Herein, $\eta_r$ is a relative viscosity.

Preparative Example 2

Employing the procedure described in PREPARATIVE EXAMPLE 1, polyester raw chips C to L were prepared according to the compositions shown in TABLE 1. Chip F and chip G are prepared from the same polyester, but in different cutting conditions. Chip G is the smaller chip to be used in a COMPARATIVE EXAMPLE. In the same TABLE, CHDM is an abbreviation for 1,4-cyclohexanedimethanol, BD for 1,4-butanediol, and DEG for diethylene glycol. The intrinsic viscosities of the polyesters were, respectively, 0.72 dl/g for chip C, 1.20 dl/g for chip D, 1.20 dl/g for chip E, 0.80 dl/g for chips F and G, 0.72 dl/g for chip H, 1.20 dl/g for chip I, 0.79 dl/g for chip J, 0.75 dl/g for chip K, and 0.70 dl/g for chip L.

Example 1 and Example 6

Each chip prepared in the PREPARATIVE EXAMPLES above was predried separately. As shown in TABLE 1, chip A (60 mass %), chip D (25 mass %) and chip E (15 mass %) were separately supplied continuously by a quantitative screw feeder into a hopper immediately above an extruder, and blended therein. The mixture was extruded in a molten state at 280° C. by a monoaxial extruder, and then rapidly cooled to give an undrawn film with a thickness of 180 μm. Compositions (theoretical content) of the constitutional units in the raw polyester for preparing the film are summarized in TABLE 2. In TABLE 2, TPA is terephthalic acid. The hopper had an inner capacity of 150 kg of the raw chip, and the discharge rate of the extruder was 450 kg per hour. Further, the inclination angle of the hopper was 70°.

The undrawn film above was slit to two halves in the longitudinal direction to give two undrawn film rolls. The undrawn films over a span of 1000 m or more were continuously preheated at 105° C. for 10 seconds, drawn 4.0 times in the transverse direction at 78° C. in a tenter, and heat-treated at 80° C. for 10 seconds, to give heat-shrinkable polyester films with a thickness of 45 μm, respectively. In EXAMPLE 1, variations in the film surface temperature during the continuous production of the film, were in the ranges of the average temperature ±1.0° C. in the preheating process, the average temperature ±2.5° C. in the drawing process, and the average temperature ±2.0° C. in the heat-treating process. In EXAMPLE 6, variations in the film surface temperature were controlled in the ranges of the average temperature ±0.5° C. in the preheating process, the average temperature ±10.4° C. in the drawing process, and the average temperature ±0.5° C. in the heat-treating process. The surface temperatures of the films were determined by a non-contact infrared surface thermometer (same in the following EXAMPLES and COMPARATIVE EXAMPLES).

Films thus obtained were slit into films with a 0.4m width and a 1000 m length, and wound around a 3 inch paper roll, respectively, to give heat-shrinkable film rolls. Physical properties (1) to (4) of the film of the film roll obtained in EXAMPLE 1 are summarized in TABLES 3 to 6 and physical properties (5) to (9) of the films of the film rolls obtained in EXAMPLE 1 and EXAMPLE 6 were summarized in TABLES 7 to 9.

Example 2 and Example 7

Each chip prepared in the PREPARATIVE EXAMPLES above was predried separately. As shown in TABLE 1, chip C (75 mass %), chip D (10 mass %) and chip E (15 mass %) were separately supplied continuously by a quantitative screw feeder into a hopper immediately above an extruder, and blended therein. The mixture was extruded in a molten state at 280° C. by a monoaxial extruder, and then rapidly cooled to give an undrawn film with a thickness of 180 μm. Compositions of the constitutional units in the raw polyester are summarized in TABLE 2. The hopper had an inner capacity of 100 kg of the raw chip, and the discharge rate of the extruder was 450 kg per hour. Further, the inclination angle of the hopper was 70°.

The undrawn film above was cut into two halves along the longitudinal direction to give two undrawn film rolls. The undrawn films over a span of 1000 m or more were continuously preheated at 100 for 10 seconds, drawn 4.0 times at 82 in the traverse direction in a tenter, and then heat-treated at 83 for 10 seconds, to give heat-shrinkable polyester films with a thickness of 45 pm, respectively. Variations in the film surface temperature during the continuous production of the film were, in EXAMPLE 4, in the ranges of the average temperature ±1.0 in the preheating process, the average temperature ±2.5 in the drawing process, and the average temperature ±2.0 in the heat-treating process. In EXAMPLE 9, the variations were in the ranges of the average temperature ±0.6 in the preheating process, the average temperature ±0.5 in the drawing process, and the average temperature ±0.5 in the heat-treating process. Each film thus obtained was slit into films with a 0.4 m width and a 1000 m length, which were wound around a 3-inch paper tube to give heat-shrinkable film rolls. Physical properties (1) to (4) of the film of the film roll obtained in EXAMPLE 4 are summarized in TABLES 3 to 6, and physical properties (5) to (9) of those in respect to the films of EXAMPLE 4 and EXAMPLE 9 are summarized in TABLES 7 to 9.

Example 3 and Example 8

Each chip prepared in the PREPARATIVE EXAMPLES above was predried separately. As shown in TABLE 1, chip F (75 mass %), chip H (10 mass %) and chip I (15 mass %) were separately supplied continuously by an quantitative screw feeder into a hopper immediately above an extruder, and blended therein. The mixture was extruded in a molten state at 280° C. by a monoaxial extruder, and then rapidly cooled to give an undrawn film with a thickness of 180 μm. Compositions of the constitutional units in the raw polyesters are summarized in TABLE 2. The hopper had a capacity of 100 kg of the raw chip, and the discharge rate of the extruder was 450 kg per hour. The angle of inclination of the hopper was 70°.

The undrawn film above was cut into two halves along the longitudinal direction to give two undrawn film rolls. Each undrawn film over a span of 1000 m or more was continuously preheated at 100 for 10 seconds, drawn 4.0 times at 82 in traverse direction in a tenter, and then heat-treated at 80 for 10 seconds, to give a heat-shrinkable polyester film with a thickness of 45 μm, respectively. Variations in the film surface temperatures during the continuous production of the films were, in EXAMPLE 3, in ranges of an average temperature ±1.0 in the preheating process, an average temperature ±2.5 in the drawing process, and an average temperature ±2.0 in the heat-treating process. In EXAMPLE 8, the variations were in ranges of an average temperature ±0.6 in the preheating process, an average temperature ±0.5 in the drawing process, and an average temperature ±0.5 in the heat-treating process. Each film thus obtained was slit into films with a 0.4 m width and a 1000 m length, which were wound around a 3-inch paper tube to give heat-shrinkable film rolls. Physical properties (1) to (4) of the film of the film roll obtained in EXAMPLE 3 are summarized in TABLES 3 to 6 and physical properties (5) to (9) of those in respect to the films of EXAMPLE 3 and EXAMPLE 8 are summarized in TABLES 7 to 9.

Example 4 and Example 9

Each chip prepared in the PREPARATIVE EXAMPLES above was predried separately. As shown in TABLE 1, chip F (54 mass %), chip H (36 mass %) and chip I (10 mass %) were separately supplied continuously by an quantitative screw feeder into a hopper immediately above an extruder, and blended therein. The mixture was extruded in a molten state at 280° C. by a monoaxial extruder, and then rapidly cooled to give an undrawn film with a thickness of 180 μm. Compositions of the constitutional units in the raw polyester are summarized in TABLE 2. The hopper had an inner capacity of 100 kg of the raw chip, and the discharge rate of the extruder was 450 kg per hour. Further, the inclination angle of the hopper was 70°.

The undrawn film above was cut into two halves along the longitudinal direction to give two undrawn film rolls. The undrawn films over a span of 1000 m or more were continuously preheated at 100 for 10 seconds, drawn 4.0 times at 82 in the traverse direction in a tenter, and then heat-treated at 83 for 10 seconds, to give heat-shrinkable polyester films with a thickness of 45 μm, respectively. Variations in the film surface temperature during the continuous production of the film were, in EXAMPLE 4, in the ranges of the average temperature ±1.0 in the preheating process, the average temperature ±2.5 in the drawing process, and the average temperature ±2.0 in the heat-treating process. In EXAMPLE 9, the variations were in the ranges of the average temperature ±0.6 in the preheating process, the average temperature ±0.5 in the drawing process, and the average temperature ±0.5 in the heat-treating process. Each film thus obtained was slit into films with a 0.4 m width and a 1000 m length, which were wound around a 3-inch paper tube to give heat-shrinkable film rolls. Physical properties (1) to (4) of the film of the film roll obtained in EXAMPLE 4 are summarized in TABLES 3 to 6, and physical properties (5) to (9) of those in respect to the films of EXAMPLE 4 and EXAMPLE 9 are summarized in TABLES 7 to 9.

Example 5 and Example 10

Each chip prepared in the PREPARATIVE EXAMPLES above was predried separately. As shown in TABLE 1, chip J (69 mass %), chip K (6 mass %) and chip L (25 mass %) were separately supplied continuously by a quantitative screw feeder into a hopper immediately above an extrude r, and blended therein. The mixture was extruded in a molten state at 280° C. by a monoaxial extruder, and then rapidly cooled to give an undrawn film with a thickness of 180 μm. Compositions of the constitutional units in the raw polyester are summarized in TABLE 2. The hopper had an inner capacity of 150 kg of the raw chip, and the discharge rate of the extruder was 400 kg per hour. Further, the inclination angle of the hopper was 75°.

The film above was cooled by being contacted to a casting roll electrostatically by impressing voltage between the casting roll and an electrode which was installed between the extruder and the casting roll.

The undrawn film above was cut into two halves along the longitudinal direction to give two undrawn film rolls. The undrawn films over a span of 1000 m or more were continuously preheated at 98 for 15 seconds, drawn 4.0 times at 80 in the traverse direction in a tenter, and then heat-treated at 80 for 10 seconds, to give a heat-shrinkable polyester film with a thickness of 45 pm, respectively. Variations in the film surface temperature during the continuous production of the films were, in EXAMPLE 5, in the ranges of the average temperature ±1.0 in the preheating process, the average temperature ±2.5 in the drawing process, and the average temperature ±2.5 in the heat-treating process. In EXAMPLE 10, the variations were in the ranges of the average temperature ±0.5 in the preheating process, the average temperature ±0.5 in the drawing process, and the average temperature ±0.6 in the heat-treating process. Each film thus obtained was slit into films with a 0.5 m width and a 1000 m length, which were wound around a 3-inch paper tube to give heat-shrinkable film rolls. Physical properties (1) to (4) of the film of the film roll obtained in EXAMPLE 5 are summarized in TABLES 3 to 6 and physical properties (5) to (9) of those in respect to the films of EXAMPLE 5 and EXAMPLE 10 are summarized in TABLES 7 to 9.

Comparative Example 1

Chip B (60 mass %), chip D (25 mass %), and chip E (15 mass %) were blended according to the composition shown in TABLE 1, and then predried. 4 Hoppers identical in shape having an inner capacity of 400 kg of raw chips and having an inclination angle of 60° were arranged in series. According to the procedures described in EXAMPLE 1 except that the chip mixture was placed in the most upstream hopper, and transferred, via the second and third hoppers, to the fourth hopper (the final hopper), a heat-shrinkable film roll of a heat-shrinkable polyester film with a thickness of 45 μm and a length of 1000 m was obtained. Physical properties of the film of the film roll thus obtained are shown in TABLES 3 to 9.

Comparative Example 2

Chip B and chip D were blended at a ratio of 60:25 (mass ratio) and then predried. 5 Hoppers identical in shape having an inner capacity of 400 kg of raw chips and having an inclination angle of 60 were arranged in series. The chip mixture was placed in the most upstream hopper, and transferred successively to the fourth hopper. Into the fifth hopper immediately above the extruder, the mixture above and chip E was added separately and continuously through quantitative feeders at a ratio 85:15, and the resulting mixture was blended in the hopper. Thereafter, according to the procedures described in EXAMPLE 1, a heat-shrinkable film roll of a heat-shrinkable polyester film with a thickness of 45 μm and a length of 1000 m was obtained. Physical properties of the film of the film roll thus obtained are shown in TABLES 3 to 9.

Comparative Example 3

Chip G (75 mass %), chip H (10 mass %), and chip I (15 mass %) were blended according to the composition shown in TABLE 1, and then predried. 3 Hoppers identical in shape having an inner capacity of 400 kg of raw chips and having an inclination angle of 60 were arranged in series. According to the procedures described in EXAMPLE 1 except that the chip mixture was placed in the most upstream hopper, and transferred, via the second hopper, to the third hopper (the final hopper), a heat-shrinkable film roll of a heat-shrinkable polyester film with a thickness of 45 μm and a length of 1000 m was obtained. Physical properties of the film of the film roll thus obtained are shown in TABLES 3 to 9.

Comparative Example 4

Chip G (75 mass %), and chip H (10 mass %) were blended according to the composition shown in TABLE 1, and then predried. 4 Hoppers identical in shape having an inner capacity of 400 kg of raw chips and having an inclination angle of 60 were arranged in series, and the chip mixture was placed in the most upstream hopper. Into the fourth and final hopper, the mixture above and chip I were supplied separately through a quantitative feeder at a ratio of 85 mass % to 15 mass %. Thereafter, according to the procedures described in EXAMPLE 1, a heat-shrinkable film roll of a heat-shrinkable polyester film with a thickness of 45 μm and a length of 1000 m. Physical properties of the film of the film roll thus obtained are shown in TABLES 3 to 9.

TABLE 1

| | Raw polyester composition (mole %) | | | | | Shape of chip (Ave., mm) | | | Chip composition (mass %) | | | | | | | | |
|---|---|---|---|---|---|---|---|---|---|---|---|---|---|---|---|---|---|
| | Dicarboxylic acid component | Diol Component | | | | Major Axis | Minor Axis | Length | EXAMPLE | | | | | CMP. EXAMPLE | | | |
| | DMT | EG | NPG | CHDM | BD | | | | 1, 6 | 2, 7 | 3, 8 | 4, 9 | 5, 10 | 1 | 2 | 3 | 4 |
| Chip A | 100 | 68 | 32 | — | — | 3.5 | 2.7 | 3.9 | 60 | — | — | — | — | — | — | — | — |
| Chip B | 100 | 68 | 32 | — | — | 2.9 | 2.5 | 2.0 | — | — | — | — | — | 60 | 60 | — | — |
| Chip C | 100 | 64 | — | 36 | — | 3.7 | 2.8 | 3.9 | — | 75 | — | — | — | — | — | — | — |
| Chip D | 100 | 100 | — | — | — | 3.7 | 2.6 | 3.7 | 25 | 10 | — | — | — | 25 | 25 | — | — |
| Chip E | 100 | — | — | — | 100 | 3.6 | 2.9 | 3.6 | 15 | 15 | — | — | — | 15 | 15 | — | — |
| Chip F | 100 | 68 | — | 32 | — | 3.5 | 2.7 | 3.8 | — | — | 75 | 54 | — | — | — | — | — |
| Chip G | 100 | 68 | — | 32 | — | 2.9 | 2.4 | 1.9 | — | — | — | — | — | — | — | 75 | 75 |
| Chip H | 100 | 100 | — | — | — | 3.7 | 2.8 | 3.9 | — | — | 10 | 36 | — | — | — | 10 | 10 |
| Chip I | 100 | — | — | — | 100 | 3.7 | 2.6 | 3.7 | — | — | 15 | 10 | — | — | — | 15 | 15 |
| Chip J | 100 | 68 | — | 32 | — | 3.8 | 2.6 | 3.8 | — | — | — | — | 69 | — | — | — | — |
| Chip K | 100 | 100 | — | — | — | 3.9 | 2.7 | 3.8 | — | — | — | — | 6 | — | — | — | — |
| Chip L | 100 | — | — | — | 100 | 3.6 | 2.8 | 3.6 | — | — | — | — | 25 | — | — | — | — |

Ave., Average;
CMP., Comparative

TABLE 2

| | Theoretical content of constitutional unit (mole %) | | | |
|---|---|---|---|---|
| | TPA + EG | TPA + NPG | TPA + CHDM | TPA + BD |
| EXAMPLE 1 | 67.9 | 18.1 | — | 14.0 |
| EXAMPLE 2 | 59.8 | — | 25.8 | 14.4 |
| EXAMPLE 3 | 62.6 | — | 23.1 | 14.3 |
| EXAMPLE 4 | 73.8 | — | 16.6 | 9.6 |
| EXAMPLE 5 | 52.9 | — | 23.2 | 23.9 |
| CMP. EXAM. 1 | 67.9 | 18.1 | — | 14.0 |
| CMP. EXAM. 2 | 67.9 | 18.1 | — | 14.0 |
| CMP. EXAM. 3 | 62.6 | — | 23.1 | 14.3 |
| CMP. EXAM. 4 | 62.6 | — | 23.1 | 14.3 |

TABLE 3

| | Primary sub constitutional unit and theoretical content (mole %) | | Content of primary sub constitutional unit (mole %) | | | | |
|---|---|---|---|---|---|---|---|
| | | | Average (A) | Maximum (Bmax) | Minimum (Bmin) | Bmax − A | A − Bmin |
| EXAMPLE 1 | TPA + NPG | 18.1 | 18.0 | 18.8 | 17.4 | 0.8 | 0.6 |
| EXAMPLE 2 | TPA + CHDM | 25.8 | 26.6 | 27.8 | 25.6 | 1.2 | 1.0 |
| EXAMPLE 3 | TPA + CHDM | 23.1 | 25.3 | 25.9 | 24.8 | 0.6 | 0.5 |
| EXAMPLE 4 | TPA + CHDM | 16.6 | 18.0 | 18.4 | 17.6 | 0.4 | 0.4 |
| EXAMPLE 5 | TPA + BD | 23.9 | 24.2 | 25.1 | 23.6 | 0.9 | 0.6 |
| CMP. EXAM. 1 | TPA + NPG | 18.1 | 18.2 | 22.6 | 14.0 | 4.6 | 4.2 |
| CMP. EXAM. 2 | TPA + NPG | 18.1 | 18.0 | 22.6 | 15.0 | 4.2 | 3.0 |
| CMP. EXAM. 3 | TPA + CHDM | 23.1 | 25.0 | 27.5 | 22.7 | 2.5 | 2.3 |
| CMP. EXAM. 4 | TPA + CHDM | 23.1 | 25.1 | 27.3 | 23.2 | 2.2 | 1.9 |

TABLE 4

|  | Secondary snb constitutional unit and theoretical content(%) | | Content of secondary sub constitutional unit (mole %) | | | | |
|---|---|---|---|---|---|---|---|
|  |  |  | Ave. (C) | Max. (Dmax) | Min. (Dmin) | Dmax − C | C − Dmin |
| EXAMPLE 1 | TPA + BD | 14.0 | 13.7 | 14.4 | 13.1 | 0.7 | 0.6 |
| EXAMPLE 2 | TPA + BD | 14.4 | 14.0 | 14.9 | 13.2 | 0.9 | 0.8 |
| EXAMPLE 3 | TPA + BD | 14.3 | 13.8 | 14.6 | 13.2 | 0.8 | 0.6 |
| EXAMPLE 4 | TPA + BD | 9.6 | 9.5 | 10.1 | 9.0 | 0.6 | 0.5 |
| EXAMPLE 5 | TPA + CHDM | 23.2 | 23.0 | 23.8 | 22.3 | 0.8 | 0.7 |
| CMP. EXAM. 1 | TPA + BD | 14.0 | 13.8 | 17.6 | 10.6 | 3.8 | 3.2 |
| CMP. EXAM. 2 | TPA + BD | 14.0 | 13.7 | 17.1 | 10.7 | 3.4 | 3.0 |
| CMP. EXAM. 3 | TPA + BD | 14.3 | 14.1 | 16.4 | 12.1 | 2.3 | 2.0 |
| CMP. EXAM. 4 | TPA + BD | 14.3 | 14.1 | 16.2 | 12.4 | 2.1 | 1.7 |

TABLE 5

|  | Solvent adhesion strength (N/15 mm) | | | | |
|---|---|---|---|---|---|
|  | Ave. (E) | Max. (Fmax) | Min (Fmin) | Fmax − E | E − Fmin |
| EXAMPLE 1 | 4.1 | 4.6 | 3.7 | 0.5 | 0.4 |
| EXAMPLE 2 | 4.3 | 5.0 | 3.9 | 0.7 | 0.4 |
| EXAMPLE 3 | 4.4 | 5.0 | 3.9 | 0.6 | 0.5 |
| EXAMPLE 4 | 4.0 | 4.3 | 3.7 | 0.3 | 0.3 |
| EXAMPLE 5 | 4.5 | 5.1 | 4.0 | 0.6 | 0.5 |
| CMP. EXAM. 1 | 4.3 | 6.4 | 1.9 | 2.1 | 2.4 |
| CMP. EXAM. 2 | 4.2 | 6.0 | 2.0 | 1.8 | 2.2 |
| CMP. EXAM. 3 | 4.1 | 6.0 | 1.8 | 1.9 | 2.3 |
| CMP. EXAM. 4 | 3.9 | 5.6 | 1.8 | 1.7 | 2.1 |

TABLE 6

|  | Glass transition temperature (° C.) | | | | |
|---|---|---|---|---|---|
|  | Ave. (G) | Max. (Hmax) | Min. (Hmin) | Hmax − G | G − Hmin |
| EXAMPLE 1 | 65 | 66 | 64 | 1 | 1 |
| EXAMPLE 2 | 65 | 66 | 64 | 1 | 1 |
| EXAMPLE 3 | 67 | 69 | 66 | 2 | 1 |
| EXAMPLE 4 | 68 | 69 | 67 | 1 | 1 |
| EXAMPLE 5 | 62 | 63 | 61 | 1 | 1 |
| CMP. EXAM. 1 | 65 | 68 | 60 | 3 | 5 |
| CMP. EXAM. 2 | 65 | 68 | 60 | 3 | 5 |
| CMP. EXAM. 3 | 67 | 71 | 62 | 4 | 5 |
| CMP. EXAM. 4 | 68 | 71 | 63 | 3 | 5 |

TABLE 7

|  | Heat shrinkage percentage in maximum shrinkage direction (%) | | | | | |
|---|---|---|---|---|---|---|
|  | Ave. (I) | Max. (Jmax) | Min. (Jmin) | Jmax − I | I − J min | Heat shrinkage defective fraction |
| EXAMPLE 1 | 53.7 | 56.9 | 50.8 | 3.2 | 2.9 | 0.2 |
| EXAMPLE 2 | 57.1 | 59.8 | 54.5 | 2.7 | 2.6 | 0.1 |
| EXAMPLE 3 | 57.7 | 60.7 | 54.5 | 3.0 | 3.2 | 0.2 |
| EXAMPLE 4 | 53.8 | 56.7 | 50.8 | 2.9 | 3.0 | 0.1 |
| EXAMPLE 5 | 67.7 | 70.5 | 64.6 | 2.8 | 3.1 | 0.1 |
| CMP. EXAM. 1 | 51.2 | 54.8 | 45.0 | 3.6 | 6.2 | 9.2 |
| CMP. EXAM. 2 | 51.5 | 55.0 | 46.3 | 3.5 | 5.2 | 6.5 |
| CMP. EXAM. 3 | 56.0 | 59.7 | 50.9 | 3.7 | 5.1 | 8.1 |
| CMP. EXAM. 4 | 56.8 | 60.6 | 51.3 | 3.8 | 5.5 | 5.9 |
| EXAMPLE 6 | 53.5 | 54.6 | 52.7 | 1.1 | 0.8 | 0 |
| EXAMPLE 7 | 57.0 | 57.8 | 56.1 | 0.8 | 0.9 | 0 |
| EXAMPLE 8 | 57.5 | 58.7 | 56.1 | 1.2 | 1.4 | 0 |
| EXAMPLE 9 | 54.0 | 55.3 | 52.5 | 1.3 | 1.5 | 0 |
| EXAMPLE 10 | 67.5 | 68.7 | 66.6 | 1.2 | 0.9 | 0 |

TABLE 8

Maximum value of the heat shrinkage stress (MPa)

| | Ave. (K) | Max. (Lmax) | Min. (Lmin) | Lmax − K | K − Lmin |
|---|---|---|---|---|---|
| EXAMPLE 1 | 7.8 | 8.4 | 7.4 | 0.6 | 0.4 |
| EXAMPLE 2 | 8.0 | 8.5 | 7.5 | 0.5 | 0.5 |
| EXAMPLE 3 | 8.2 | 8.6 | 7.5 | 0.4 | 0.7 |
| EXAMPLE 4 | 8.3 | 8.9 | 7.7 | 0.6 | 0.6 |
| EXAMPLE 5 | 7.1 | 7.8 | 6.3 | 0.7 | 0.8 |
| CMP. EXAM. 1 | 7.9 | 9.0 | 6.9 | 1.1 | 1.0 |
| CMP. EXAM. 2 | 8.0 | 8.9 | 7.0 | 0.9 | 1.0 |
| CMP. EXAM. 3 | 7.8 | 8.8 | 7.1 | 1.0 | 0.7 |
| CMP. EXAM. 4 | 8.0 | 9.1 | 7.4 | 1.1 | 0.6 |
| EXAMPLE 6 | 7.9 | 8.2 | 7.7 | 0.3 | 0.2 |
| EXAMPLE 7 | 8.1 | 8.3 | 7.8 | 0.2 | 0.3 |
| EXAMPLE 8 | 8.0 | 8.4 | 7.7 | 0.4 | 0.3 |
| EXAMPLE 9 | 8.4 | 8.8 | 8.0 | 0.4 | 0.4 |
| EXAMPLE 10 | 6.9 | 7.2 | 6.5 | 0.3 | 0.4 |

TABLE 9

Heat shrinkage percentage in orthogonal direction (%)

| | Ave. (M) | Max. (Nmax) | Min. (Nmin) | Nmax − M | M − Nmin |
|---|---|---|---|---|---|
| EXAMPLE 1 | 3.8 | 5.1 | 2.4 | 1.3 | 1.4 |
| EXAMPLE 2 | 3.5 | 5.0 | 2.3 | 1.5 | 1.2 |
| EXAMPLE 3 | 3.4 | 4.6 | 2.1 | 1.2 | 1.3 |
| EXAMPLE 4 | 4.2 | 5.6 | 3.1 | 1.4 | 1.1 |
| EXAMPLE 5 | 2.2 | 3.6 | 1.2 | 1.4 | 1.0 |
| CMP. EXAM. 1 | 3.9 | 6.4 | 2.0 | 2.5 | 1.9 |
| CMP. EXAM. 2 | 3.6 | 5.9 | 1.7 | 2.3 | 1.9 |
| CMP. EXAM. 3 | 3.2 | 5.2 | 1.2 | 2.0 | 2.0 |
| CMP. EXAM. 4 | 4.0 | 5.9 | 1.9 | 1.9 | 2.1 |
| EXAMPLE 6 | 3.7 | 4.5 | 3.2 | 0.8 | 0.5 |
| EXAMPLE 7 | 3.6 | 4.1 | 3.3 | 0.5 | 0.3 |
| EXAMPLE 8 | 3.5 | 4.1 | 3.1 | 0.6 | 0.4 |
| EXAMPLE 9 | 4.1 | 4.8 | 3.6 | 0.7 | 0.5 |
| EXAMPLE 10 | 2.0 | 2.5 | 1.5 | 0.5 | 0.5 |

As it is apparent from the data in TABLES 1 to 9, in COMPARATIVE EXAMPLES wherein relatively smaller chip B or G for COMPARATIVE EXAMPLE was used and a plurality of hoppers in series were used, there was observed uneven supply of the raw chips, leading to larger variations in the film composition and the physical properties. As the result, the heat shrinkage defective fraction of the resulting labels became higher. On the other hand, in EXAMPLES wherein chips uniform in size were used, there were no such uneven supply of the raw chips and thus no significant variations in the composition of the resulting film. Further, in EXAMPLES 6 to 10 wherein the surface temperature of the film in the drawing process was strictly controlled, it was confirmed that the variation in heat shrinkage properties of the resulting film was also distinctly small.

Example 11

According to the procedures described in PREPARATIVE EXAMPLE 1 except that 78 mole % of dimethyl terephthalate and 22 mole % of dimethyl isophthalate were used as dicarboxylic acid components, and 100 mole % of ethylene glycol was were used as a diol component, the ester exchange reaction and the polycondensation were conducted. From the resulting polyester, chip M was obtained according to the procedure similar to PREPARATIVE EXAMPLE 1. An average of the major axis of the cross section of this chip M was 3.5 mm, that of the minor axis was 2.8 mm, and an average length of the chips was 3.9 mm. Additionally, the intrinsic viscosity of this polyester was 0.70 dl/g.

Using 72 mass % of chip M above and 28 mass % of chip D, a heat-shrinkable film roll was produced accroding to the procedure similar to EXAMPLE 1. The theoretical content of the constitutional units of this film are 84.2 mole % for TPA+EG, and 15.8 mole % for IPA (isophthalic acid)+EG.

Samples were cut off from the film roll according to the procedure described in the procedure (1), and the content of the IPA+EG unit (primary sub constitutional unit) was determined, to give an average (A) of 16.0 mole %, the maximum value (Bmax) of 16.5 mole %, the minimum value (Bmin) of 15.6 mole %, Bmax-A of 0.5 mole %, and A-Bmin of 0.4 mole %, confirming that the variations were small.

INDUSTRIAL APPLICABILITY

A film roll of a heat-shrinkable polyester film of the present invention is small in variations in composition and physical properties of the long film wound over the full length, leading to a drastic decrease in the incidence of defects in the solvent adhesion process, and in the incidence of defects such as insufficient shrinkage, shrinkage shading, crinkling, deformation, uneven shrinkage, etc., in the heat shrinkage process. Additionally, a process for producing a heat-shrinkable film roll of the present invention is very useful in the industrial production of the film, since the process can easily decrease variations in the polymer composition and heat shrinkage properties of the long film.

What is claimed is:

1. A film roll of a heat-shrinkable polyester film, the length of the film roll ranging from 1000 m to 6000 m, and the heat-shrinkable polyester film meeting the following requirements (1), (2) and (3):
    (1) when an initiation end of winding of a film, which is obtained from a steady region where physical properties of the film are stabilized in a longitudinal direction, is designated as a first end;
    a termination end of winding thereof is designated as a second end;
    a first cut-off point of samples of the film is provided at a position 2 m or less inner from the second end,
    a final cut-off point of the samples is provided at a position 2 m or less inner from the first end;
    a plurality of additional sample cut-off points are provided at an interval of about 100 m from the first cut-off point, the samples being square samples in a size of 10 cm×10 cm cut off from each of the cut-off points; and
    all the samples have a heat shrinkage percentage of 20% or more in the maximum shrinkage direction after the respective samples are immersed in hot water at 85° C. for 10 seconds, subsequently in water at 25° C. for 10 seconds, and then withdrawn;
    (2) when a raw polymer used for production of the film comprises a major constitutional unit and one or more sub constitutional units different therefrom;
    the sub constitutional unit which is present in the greatest amount among all the sub constitutional units is designated as a primary sub constitutional unit;
    the content of the primary sub constitutional unit in the each sample properly cut off from each of the cut-off points described in the requirement (1) is 7 mole % or more in 100 mole % of all the constitutional units; and when an average of the content of the primary sub constitutional unit is calculated, the contents thereof of all the samples fall within a range of ±2 mole % relative to the average content, wherein the major constitutional unit is an ethylene terephthalate unit, and the primary sub constitutional unit is a unit consisting of neopentyl glycol and terephthalic acid, or a unit consisting of 1,4-butanediol and terephthalic acid, or a unit consisting of 1,4-cyclohexane dimethanol and terephthalic acid, or a unit consisting of ethylene glycol and isophthalic acid; and (3) when an average of the heat shrinkage percentages in the maximum shrinkage direction of the samples defined in the requirement (1) is calculated, the heat shrinkage percentages of all the samples fall within a range of ±3% relative to the average.

2. A film roll of a heat-shrinkable polyester film, the heat-shrinkable polyester film meeting the requirements (1), (2), and (3) defined in claim 1, and the following requirement (4):

(4) when a raw polymer-used for production of the film comprises a major constitutional polymer and one or more sub constitutional units different therefrom;

the sub constitutional unit which is present in the second largest amount among all the sub constitutional units is designated as a secondary sub constitutional unit;

the content of the secondary sub constitutional unit in each sample properly cut off from each of the cut-off points defined in the requirement (1) is 5 mole % or more in 100 mole % of all the constitution units; and when an average of the content of the secondary sub constitutional unit is calculated, the contents thereof of all the samples fall within a range of ±2 mole % relative to the average content.

3. A film roll of a heat-shrinkable polyester film defined in claim 2, wherein the contents of the secondary sub constitutional unit of all the samples fall within a range of ±1 mole % relative to the average content.

4. A film roll of a heat-shrinkable polyester film, the heat-shrinkable polyester film meeting the requirements (1), (2), and (3) defined in claim 1, and the following requirement (5):

(5) in respect to a tubular film roll which is obtained by performing the steps of slitting the film in the steady region having stable physical properties along the longitudinal direction of the film at a certain internal in a transverse direction into film strips, folding the film strip transversely so as to overlap the corresponding transverse edges of the film strip, bonding the edges by the use of 1,3-dioxolane as an adhesion solvent to produce a tubular film, and winding the resulting tubular film in a flattened state, when a first cut-off point of samples of the tubular film roll is provided at a position 2 m or less inner from a termination end of the tubular film roll;

a final cut-off point is provided at a position 2 m or less inner from an initiation end thereof;

a plurality of additional sample cut-off points are provided at an interval of about 100 m from the first cut-off point;

the tubular sample obtained at each cut-off point is cut open into a film sample with a width of 15 mm;

the film sample is placed in a tensile tester having chucks disposed at a distance of 50 mm in such a manner that the solvent adhesion portion of the film sample is located at the center between the chucks;

a solvent adhesion strength of the film sample is measured in a condition of a temperature of 23° C. and a tension of test rate of 200 mm/min;

the solvent adhesion strength of each film sample is 1N/15 mm width or more; and when an average of the solvent adhesion strength is calculated, the solvent adhesion strengths of all the film samples fall within a range of ±2N/15 mm width relative to the average.

5. A film roll of a heat-shrinkable polyester film defined in claim 4, wherein the solvent adhesion strengths of all the film samples fall within a range of ±1.8 N/15 mm width relative to the average.

6. A film roll of a heat-shrinkable polyester film, the heat-shrinkable polyester film meeting the requirements (1), (2), and (3) defined in claim 1, and the following requirement (6):

(6) when a glass transition temperature of the sample properly cut off from each of the cut-off points defined in the requirement (1) of claim 1 is determined and an average of the glass transition temperatures is calculated, the glass transition temperatures of all the samples fall within a range of ±4° C. relative to the average.

7. A film roll of a heat-shrinkable polyester film, the heat-shrinkable polyester film meeting the requirements (1), (2), and (3) defined in claim 1, and the following requirement (7):

(7) when a heat shrinkage stress in the maximum shrinkage direction of each of the samples cut off from the cut-off points defined in the requirement (1) of claim 5 is determined in a condition of a temperature of 90° C., a flow rate of hot air of 5 msec, a sample width of 20 mm, and a distance between chucks of 100 mm, the maximum values of the heat shrinkage stress of all the samples are 3.0 MPa or more; and when an average of the maximum values of the heat shrinkage stress is calculated, the maximum values of the heat shrinkage stress of all the samples fall within a range of ±1.0 MPa relative to the average.

8. A film roll of a heat-shrinkable polyester film defined in claim 7, wherein the maximum values of the heat shrinkage stress of all the samples fall within a range of ±0.5 MPa relative to the average.

9. A film roll of a heat-shrinkable polyester film, the heat-shrinkable polyester film meeting the requirements (1), (2), and (3) defined in claim 1, and the following requirement (8):

(8) when the square sample of 10 cm×10 cm cut off from each of the cut-off points defined in the requirement (1) of claim 5 is immersed in hot water at 85° C. for 10 seconds and then in water at 25° C. for 10 seconds, heat shrinkage percentages in the direction orthogonal to the maximum shrinkage direction of all the samples are 7% or less; and when an average of the heat shrinkage percentages in the orthogonal direction is calculated, the heat shrinkage percentages of all the samples in the orthogonal direction fall within a range of ±2% relative to the average.

10. A film roll of a heat-shrinkable polyester film defined in claim 9, wherein the heat shrinkage percentages in the orthogonal direction of all the samples fall within a range of ±1.8% relative to the average.

11. A film roll of a heat-shrinkable polyester film defined in claim 1, wherein the heat-shrinkable polyester film has a width of 0.2 m or more.

12. A film roll of a heat-shrinkable polyester film defined in claim 1, wherein the heat shrinkage percentages of all the samples fall within a range of ±2% relative to the average.

13. A film roll of a heat-shrinkable polyester film defined in claim 1, wherein the contents of the primary sub constitutional unit of all the samples fall within a range of ±1.5 mole % relative to the average content.

14. A film roll of a heat-shrinkable polyester film, the length of the film roll ranging from 1000 m to 6000 m, and the heat-shrinkable polyester film meeting the following requirements (1), (2) and (9):
- (1) when an initiation end of winding of a film, which is obtained from a steady region where physical properties of the film are stabilized in a longitudinal direction, is designated as a first end;
  a termination end of winding thereof is designated as a second end;
  a first cut-off point of samples of the film is provided at a position 2 m or less inner from the second end,
  a final cut-off point of the samples is provided at a position 2 m or less inner from the first end;
  a plurality of additional sample cut-off points are provided at an interval of about 100 m from the first cut-off point,
  the samples being square samples in a size of 10 cm×10 cm cut off from each of the cut-off points; and
  all the samples have a heat shrinkage percentage of 20% or more in the maximum shrinkage direction after the respective samples are immersed in hot water at 85° C. for 10 seconds, subsequently in water at 25° C. for 10 seconds, and then withdrawn;
- (2) when a raw polymer used for production of the film comprises a major constitutional unit and one or more sub constitutional units different therefrom;
  the sub constitutional unit which is present in the greatest amount among all the sub constitutional units is designated as a primary sub constitutional unit;
  the content of the primary sub constitutional unit in the each sample properly cut off from each of the cut-off points described in the requirement (1) is 7 mole % or more in 100 mole % of all the constitutional units; and
  when an average of the content of the primary sub constitutional unit is calculated, the contents thereof of all the samples fall within a range of ±2 mole % relative to the average content,
  wherein the major constitutional unit is an ethylene terephthalate unit, and the primary sub constitutional unit is a unit consisting of neopentyl glycol and terephthalic acid, or a unit consisting of 1,4-butanediol and terephthalic acid, or a unit consisting of 1,4-cyclohexane dimethanol and terephthalic acid, or a unit consisting of ethylene glycol and isophthalic acid; and
- (9) when an average of the heat shrinkage percentages in the maximum shrinkage direction of the samples defined in the requirement (1) is calculated, the heat shrinkage percentages of all the samples fall within a range of ±5% relative to the average;
  wherein the film is produced by blending a polymer used in the greatest amount and one or more polymers different in compositions therefrom.

15. A film roll of a heat-shrinkable polyester film, the heat-shrinkable polyester film meeting the requirements (1), (2), and (9) defined in claim 14, and the following requirement (4):
- (4) when a raw polymer-used for production of the film comprises a major constitutional polymer and one or more sub constitutional units different therefrom;
  the sub constitutional unit which is present in the second largest amount among all the sub constitutional units is designated as a secondary sub constitutional unit;
  the content of the secondary sub constitutional unit in the each sample properly cut off from each of the cut-off points defined in the requirement (1) is 5 mole % or more in 100 mole % of all the constitutional units; and
  when an average of the content of the secondary sub constitutional unit is calculated, the contents thereof of all the samples fall within a range of ±2 mole % relative to the average content.

16. A film roll of a heat-shrinkable polyester film defined in claim 15, wherein the contents of the secondary sub constitutional unit of all the samples fall within a range of ±1 mole % relative to the average content.

17. A film roll of a heat-shrinkable polyester film, the heat-shrinkable polyester film meeting the requirements (1), (2), and (9) defined in claim 14, and the following requirement (5):
- (5) in respect to a tubular film roll which is obtained by performing the steps of slitting the film in the steady region having stable physical properties along the longitudinal direction of the film at a certain internal in a transverse direction into film strips, folding the film strip transversely so as to overlap the corresponding transverse edges of the film strip, bonding the edges by the use of 1,3-dioxolane as an adhesion solvent to produce a tubular film, and winding the resulting tubular film in a flattened state,
  when a first cut-off point of samples of the tubular film roll is provided at a position 2 m or less inner from a termination end of the tubular film roll;
  a final cut-off point is provided at a position 2 m or less inner from an initiation end thereof;
  a plurality of additional sample cut-off points are provided at an interval of about 100 m from the first cut-off point;
  the tubular sample obtained at each cut-off point is cut open into a film sample with a width of 15 mm;
  the film sample is placed in a tensile tester having chucks disposed at a distance of 50 mm in such a manner that the solvent adhesion portion of the film sample is located at the center between the chucks;
  a solvent adhesion strength of the film sample is measured in a condition of a temperature of 23° C. and a tension test rate of 200 mm/min;
  the solvent adhesion strength of each film sample is 1N/15 mm width or more; and
  when an average of the solvent adhesion strength is calculated, the solvent adhesion strengths of all the film samples fall within a range of ±2N/15 mm width relative to the average.

18. A film roll of a heat-shrinkable polyester film defined in claim 17, wherein the solvent adhesion strengths of all the film samples fall within a range of ±1.8 N/15 mm relative to the average.

19. A film roll of a heat-shrinkable polyester film, the heat-shrinkable polyester film meeting the requirements (1), (2), and (9) defined in claim 14, and the following requirement (6):
- (6) when a glass transition temperature of the sample properly cut off from each of the cut-off points defined in the requirement (1) of claim 18 is determined and an average of the glass transition temperatures is calculated, the glass transition temperatures of all the samples fall within a range of ±4° C. relative to the average.

20. A film roll of a heat-shrinkable polyester film, the heat-shrinkable polyester film meeting the requirements (1), (2), and (9) defined in claim 14, and the following requirement (7):
- (7) when a heat shrinkage stress in the maximum shrinkage direction of each of the samples cut off from the cut-off points defined in the requirement (1) of claim 18 is determined in a condition of a temperature of 90° C., a flow rate of hot air of 5 m/sec, a sample width of 20 mm, and a distance between chucks of 100 mm, the maximum values of the heat shrinkage stress of all the samples are 3.0 MPa or more; and when an average of the maximum values of the heat shrinkage stress is calculated, the maximum values of the heat shrinkage stress of all the samples fall within a range of ±1.0 MPa relative to the average.

21. A film roll of a heat-shrinkable polyester film defined in claim 20, wherein the maximum values of the heat shrinkage stress of all the samples fall within a range of ±0.5 MPa relative to the average.

22. A film roll of a heat-shrinkable polyester film, the heat-shrinkable polyester film meeting the requirements (1), (2), and (9) defined claim 14, and the following requirement (8):

(8) when the square sample of 10 cm×10 cm cut off from each of the cut off points defined in the requirement (1) of claim 18 is immersed in hot water at 85° C. for 10 seconds and then in water at 25° C. for 10 seconds, heat shrinkage percentages in the direction orthogonal to the maximum shrinkage direction of all the samples are 7% or less; and when an average of the heat shrinkage percentages in the orthogonal direction is calculated, the heat shrinkage percentages of all the samples in the orthogonal direction fall within a range of ±2% relative to the average.

23. A film roll of a heat-shrinkable polyester film defined in claim 22, wherein the heat shrinkage percentages in the orthogonal direction of all the samples fall within a range of ±1.8% relative to the average.

24. A film roll of a heat-shrinkable polyester film defined in claim 14, wherein the heat-shrinkable polyester film has a width of 0.2 m or more.

25. A film roll of a heat-shrinkable polyester film defined in claim 14, wherein the heat shrinkage percentages in the maximum direction of all the samples fall within a range of ±3% relative to the average.

26. A film roll of a heat-shrinkable polyester film defined in claim 14, wherein the contents of the primary sub constitutional unit of all the samples fall within a range of ±1.5 mole % relative to the average content.

* * * * *